(12) United States Patent
Son et al.

(10) Patent No.: US 8,990,871 B2
(45) Date of Patent: Mar. 24, 2015

(54) METHOD FOR PROVIDING REMOTE CONTROL SERVICE AND IMAGE DISPLAY APPARATUS THEREOF

(75) Inventors: Hyeongho Son, Seoul (KR); Suhee Jun, Seoul (KR)

(73) Assignee: LG Electronics Inc., Seoul (KR)

( * ) Notice: Subject to any disclaimer, the term of this patent is extended or adjusted under 35 U.S.C. 154(b) by 230 days.

(21) Appl. No.: 13/283,834

(22) Filed: Oct. 28, 2011

(65) Prior Publication Data

US 2012/0198488 A1 Aug. 2, 2012

Related U.S. Application Data

(60) Provisional application No. 61/437,691, filed on Jan. 31, 2011, provisional application No. 61/429,321, filed on Jan. 3, 2011.

(30) Foreign Application Priority Data

Feb. 14, 2011 (KR) .................. 10-2011-0012820

(51) Int. Cl.
| | |
|---|---|
| H04N 7/173 | (2011.01) |
| H04H 60/33 | (2008.01) |
| H04N 21/4227 | (2011.01) |
| H04N 21/4425 | (2011.01) |
| H04N 21/6543 | (2011.01) |

(52) U.S. Cl.
CPC ....... *H04N 21/4227* (2013.01); *H04N 21/4425* (2013.01); *H04N 21/6543* (2013.01)
USPC ...................................................... 725/107

(58) Field of Classification Search
None
See application file for complete search history.

(56) References Cited

U.S. PATENT DOCUMENTS

| | | | |
|---|---|---|---|
| 5,243,651 A | 9/1993 | Parikh et al. | 380/20 |
| 7,206,548 B1* | 4/2007 | Sumler et al. | 455/67.11 |
| 2001/0054161 A1 | 12/2001 | Wooddruff | 714/27 |
| 2003/0097563 A1* | 5/2003 | Moroney et al. | 713/170 |
| 2004/0237103 A1* | 11/2004 | Kondo et al. | 725/37 |
| 2004/0244056 A1* | 12/2004 | Lorenz et al. | 725/135 |
| 2005/0251448 A1* | 11/2005 | Gropper | 705/14 |
| 2007/0046821 A1 | 3/2007 | Mead et al. | 348/571 |
| 2007/0264862 A1 | 11/2007 | Hallberg | 439/489 |
| 2008/0166105 A1* | 7/2008 | Vanderhoff | 386/124 |
| 2010/0281498 A1* | 11/2010 | Tanemura et al. | 725/25 |

(Continued)

FOREIGN PATENT DOCUMENTS

| | | |
|---|---|---|
| JP | 2004-328741 | 1/2004 |
| KR | 10-2003-0010233 | 2/2003 |

(Continued)

OTHER PUBLICATIONS

International Search Report dated Jul. 12, 2012.
European Search Report dated Apr. 17, 2014, issued in Application No. 11 85 4956.

*Primary Examiner* — Jason K Lin
(74) *Attorney, Agent, or Firm* — KED & Associates LLP

(57) ABSTRACT

A system for servicing a display device is performed remotely through a network server. The server establishes a connection with the display device, transmits a first signal through the connection to instruct the display device to automatically perform a predetermined function, receives a captured image derived from a screen of the display device after performance of the predetermined function, and transmits a second signal through the connection to control at least one feature of the display device.

9 Claims, 19 Drawing Sheets

(56) References Cited

U.S. PATENT DOCUMENTS

2010/0299696 A1* 11/2010 Konishi .................... 725/25
2011/0175977 A1* 7/2011 Dahl ..................... 348/14.12

FOREIGN PATENT DOCUMENTS

| KR | 10-2010-0073344 | 7/2010 |
| KR | 10-2010-0088680 | 8/2010 |

* cited by examiner

METHOD FOR PROVIDING REMOTE CONTROL SERVICE AND IMAGE DISPLAY APPARATUS THEREOF

CROSS REFERENCE TO RELATED APPLICATIONS

Pursuant to 35 U.S.C. §119(e), this application claims benefit of U.S. Provisional Applications Ser. Nos. 61/437,691 filed on Jan. 31, 2011 and 61/429,321 filed on Jan. 3, 2011, and pursuant to 35 U.S.C. 119(a), this application also claims the benefit the Korean Patent Application No. 10-2011-0012820, filed on Feb. 14, 2011, which are hereby incorporated by reference as if fully set forth herein.

BACKGROUND

1. Field

One or more embodiments described herein relate to controlling a display device.

2. Background

Servicing televisions, monitors, and other display devices has required a technician to make a customer visit or has required the customer to personally transport the device to a technician's site. This has placed a burden on the convenience of the user or technician, made the servicing process inefficient, introduced delays, and increased costs at least to the customer.

DETAILED DESCRIPTION

Figure 1:
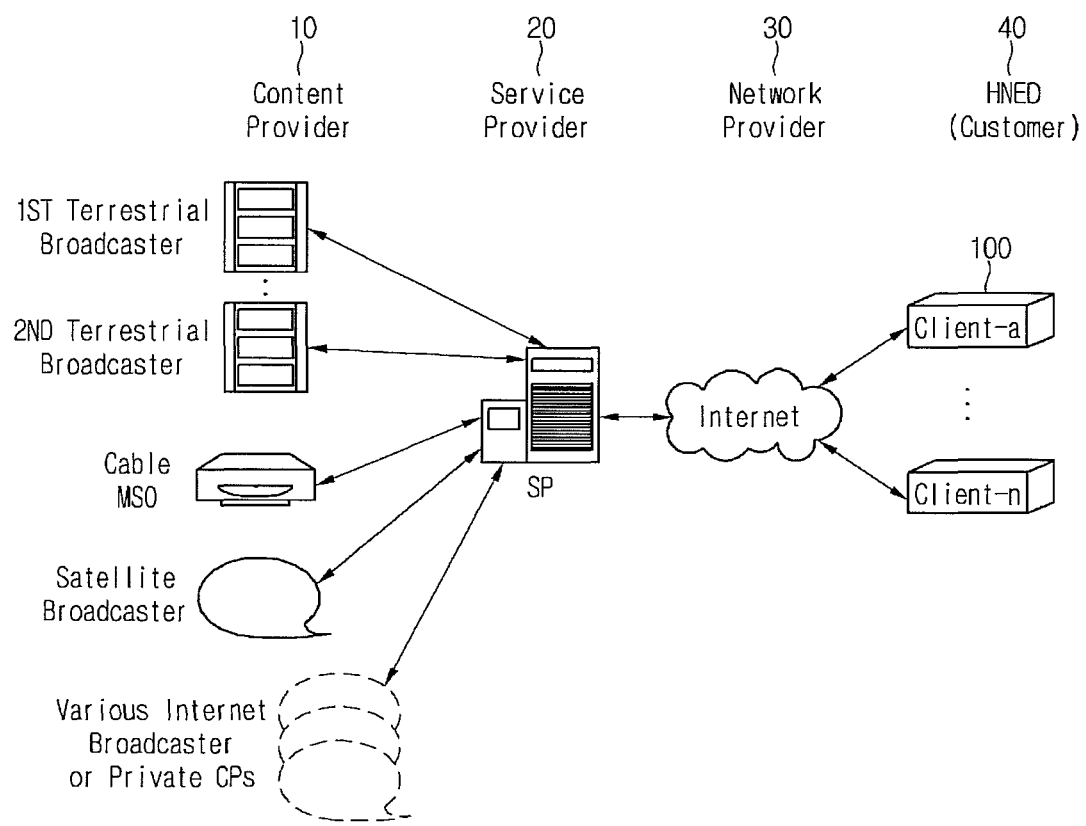
FIG. 1 shows a first embodiment of a broadcast system.

FIG. 1 shows a first embodiment of a broadcast system which includes an image display apparatus. The broadcast system includes a content provider (CP) 10, a service provider (SP) 20, a network provider (NP) 30 and a HNED 40. In this embodiment, the HNED 40 may correspond to a client 100 of an image display apparatus. For example, client 100 may be a network TV, a smart TV, an IPTV, monitor, or another type of display device.

The content provider 10 produces and/or provides content of various types for viewing on the image display apparatus. The content provider, for example, may be one or more of a terrestrial broadcaster, a cable system operator (SO) or a multiple system operator (MSO), a satellite broadcaster, various internet broadcasters, or the like as shown in FIG. 1. Also, the content provider 10 may provide various applications together with broadcast content as described in greater detail below.

The service provider 20 may provide by service packaging content provided by the content provider 10. For example, the service provider 20 may provide by packaging a first terrestrial broadcasting, a second terrestrial broadcasting, the cable MSO, the satellite broadcasting, various internet broadcasting, applications, and the like, to the user. The service provider 20 may also provide services to the client 100 by using an unicast or multicast method.

The unicast manner is a way of transmitting data between one sender and one recipient in one-to-one transmission. For example, in case of the unicast manner, when requesting data from the receiver to the server, the server may transmit the data to receiver according to the request.

The multicast manner is a manner of transmitting the data to a plurality of recipients of a particular group, for example, the server may transmit data to a plurality of receivers already registered at a time. An internet group management protocol (IGMP), and the like may be used for such a multicast registration.

The network provider 30 may provide a network terminal providing services such as described above to the client 100, and the client 100 may receive services by establishing the Home Network End User (HNED).

A conditional access or content protection and the like may be used as means for protecting content transmitted in the system described above. A cable card, a downloadable conditional access system, and the like may be used as one example for protecting the content or the conditional access.

Meanwhile, client 100 may also provide contents through a network. In this case, the client 100 may be the content provider, and the content provider 10 may also receive the contents from the client 100. As a result, an interactive content service or data service may be provided.

According to one embodiment, the content provider 10 may provide network services such as a social network site (SNS), a Blog, a micro Blog or an instant messenger, and the like. For example, the content provider 10 providing the SNS service includes a server (not shown) storing various types of contents such as created texts or uploaded images in the social network site SNS by the plurality of users.

More specifically, the user connects to the server of the content provider 10 providing the SNS service by using the image display apparatus and specifies a plurality of desired accounts, such that the user may confirm the created messages by the plurality specified accounts.

In addition, when the user requests the SNS service, the image display apparatus, the client 100, connects to the server of the content provider 10, receives messages of the specified accounts, and arranges and displays the received message from above in the order in which the corresponding messages are created.

Figure 2:
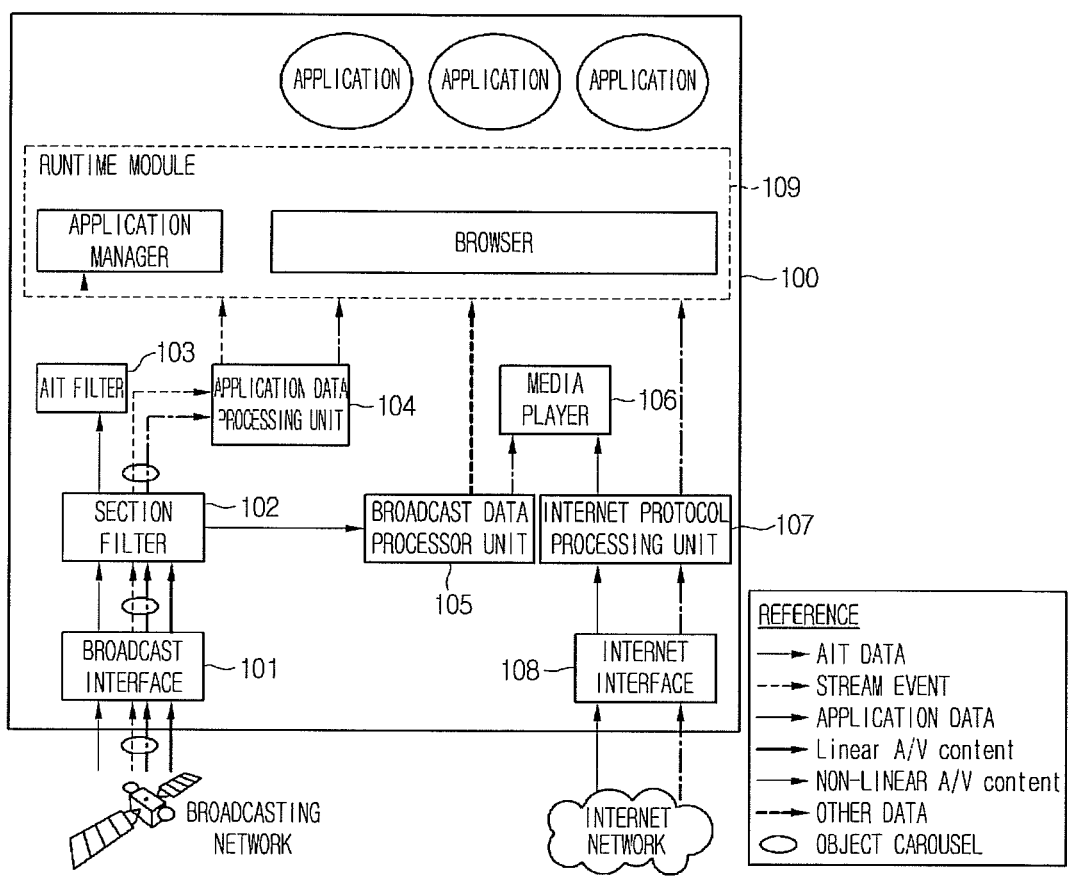
FIG. 2 shows another embodiment of a broadcast system.

Referring to FIG. 2, according to one embodiment, the image display apparatus 100 corresponding to the client shown in FIG. 1 may connect to a broadcasting network and an internet network.

For example, the image display apparatus 100 may include a broadcasting interface 101, a section filter 102, an AIT filter 103, an application data processing unit 104, a broadcasting data processing unit 105, a media player 106, an internet protocol processing unit 107, an internet interface 108, and a run time module 109.

Meanwhile, the broadcasting interface 101 of the image display apparatus 100 may receive an application information table data, real time broadcasting content, application data or a stream event, and the like, and the real time broadcasting content may be a linear A/V content.

The section filter 102 may perform a section filtering for four data received from the broadcasting interface 101, transmit the AIT data to the AIT filter 103, transmit a linear A/V content to the broadcasting processing unit 105, and transmit a stream event and an application data to the application data processing unit 104.

The internet interface 108 may receive a non-linear A/V content and an application data, for example, the non-linear A/V content may be content on demand (COD) application. The non-linear A/V content may be transmitted to the media player 106, and the application data may be transmitted to the run time module 109.

In addition, the run time module 109 may include an application manager and a browser, the application manager may control a life cycle for an interactive application using AIT data, and the browser may serve to display and process the interactive application.

Figure 3:
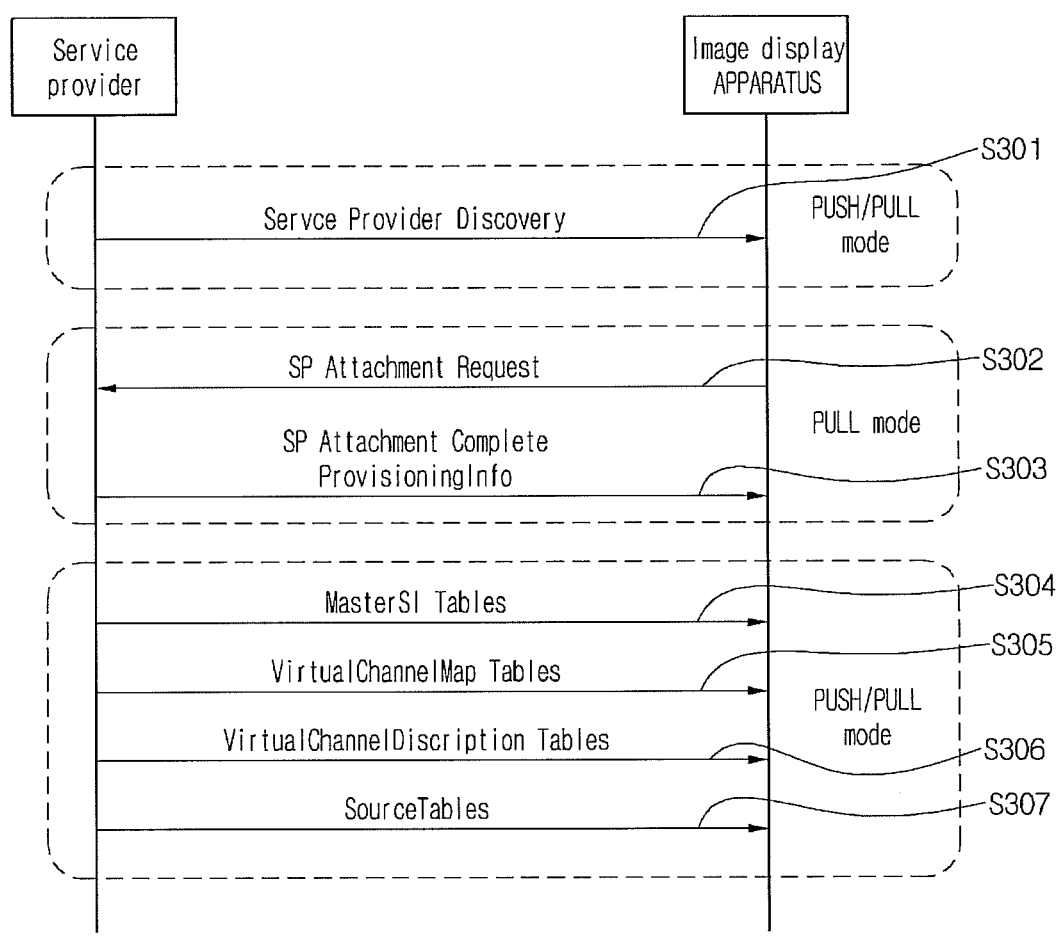
FIG. 3 shows a first embodiment of a method of transmitting and receiving data between a display apparatus and a service provider.

FIG. 3 is a diagram showing an embodiment of a method of transmitting and receiving data between an image display apparatus and a service provider. Referring to FIG. 3, the service provider performs the operation of a service provider discovery (S301). The image display apparatus transmits a service provider (SP) attachment request signal (S302). When completing the SP attachment, the image display apparatus receives provisioning information (S303). Furthermore, the image display apparatus receives master SI tables (S304), receives virtual channel map tables (S305), receives virtual channel description tables (S306) and receives source tables (S307), from the service provider.

For example, the service provider discovery may mean the procedure of allowing service providers providing the service associated with the IPTV to find the server which provides the information for their services.

As methods of finding an address list capable of receiving the information (for example, SP discovery information) for the service discovery (SD) server, the following three methods will be described by way of example. First, the address pre-set in the image display apparatus or the address set by a manual operation of the user may be used. Second, a SP discovery method based on DHCP may be used. Third, a DNS SRV-based SP discovery method may be used.

In addition, the image display apparatus is connected to a server of the address obtained by any one of the three methods, receives a service provider discovery record including the information needed in service discovery for each SP, and processes the service searching by using the service provider discovery record. Meanwhile, the procedures described above may perform both of a push mode and a pull mode.

Meanwhile, the image display apparatus is connected to the SP attachment server designated by a SP attachment locator of a SP discovery record and performs a registration procedure (or a service attachment procedure). In addition, the image display apparatus is connected to an SP authentication service server designated by a SP authentication locator, and may performs the service authentication after performing the separate authentication procedure.

After completing the service attachment procedure, data from the server to the image display apparatus may be a type of provisioning information table.

During the service attachment procedure, the image display apparatus provides data transmitted to the server with its own ID and a location information, and the service attachment server may specifies a service to which the image display apparatus has subscribed, based on the ID and the location information.

Address information capable of obtaining the service information to be received by the image display apparatus may be provided as a type of a provisioning information table. Meanwhile, the address information may be corresponded to connection information of a mater SI table. In this case, a personalized service for each subscriber may be provided easily.

In addition, the service information may include a master SI table record which manages a connection information and version for a virtual channel map, a virtual channel map table which provides service lists of a package type, a virtual channel description table which includes detail information of each of the channels, a source table which includes connection information to access actual services, and the like.

Figure 4:
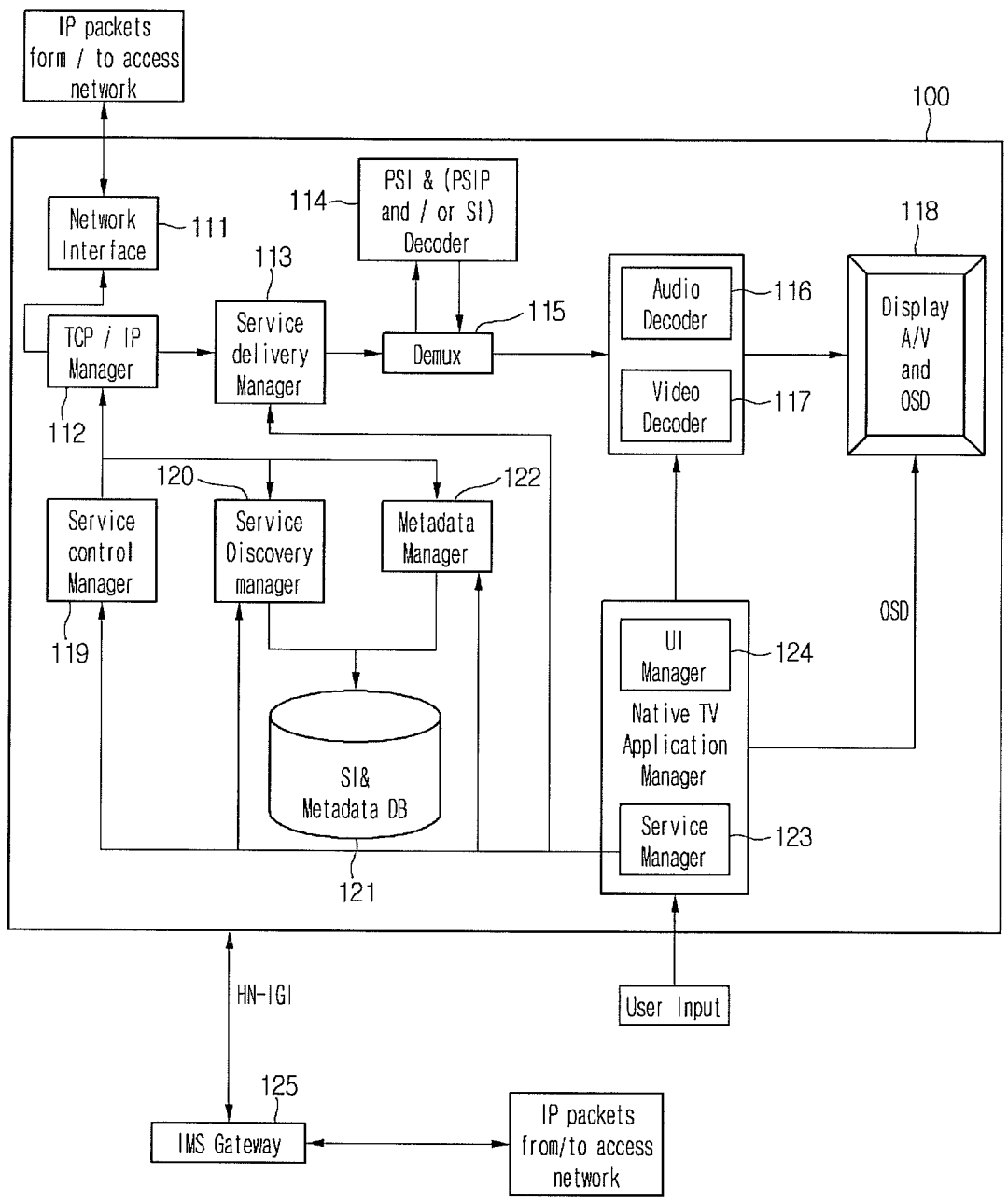
FIG. 4 shows one example of the display apparatus.

FIG. 4 is a block diagram showing the configuration of an image display apparatus according to one embodiment. Referring to FIG. 4, the image display apparatus 100 may include a network interface unit 111, a TCP/IP Manager 112, a service delivery manager 113, a de-multiplexer (Demux) 115, a PSI & (PSIP and/or SI) decoder 114, an audio decoder 116, a video decoder 117, a display A/V and OSD module 118, a service control manager 119, a service discovery manager 120, a metadata manager 122, a SI & Metadata DB 121, an UI manager 124 and a service manager 123.

The network interface unit 111 may receive and transmit packets from and to the network terminal. That is, the network interface unit 111 may receive services and contents, and the like from the service provider through the network.

The TCP/IP manager 112 may be concerned with a packet received in the image display apparatus 100 and a packet transmitted by the image display apparatus 100, that is, the packet transmission from the source to the destination. In addition, the TCP/IP manager 112 may classify the received packets to correspond to proper protocols, and output packets from the service delivery manager 113, the service discovery manager 120, the service control manager 119 and the metadata manager 122.

Meanwhile, the service delivery manager 113 is responsible for control of the received service data and, for example, when controlling real-time streaming data, RTP/RTCP may be used.

When the real-time streaming data is transmitted using the RTP, the service delivery manager 113 may parse the received data packets according to the RTP, and transmit to the multiplexer 115 or store in the SI & metadata DB 121 according to the control of the service manager 123. In addition, the service delivery manager 113 may feed back the network receiving information to the service providing server by using the RTCP.

The de-multiplexer 115 may de-multiplex the received packets to an audio, a video, a program specific information data, and the like, and transmit to the audio/video decoder 116, 117 and PSI & (PSIP and/or SI) decoder 114, respectively.

The PSI & (PSIP and/or SI) decoder 114 may decode the service information such as a program specific information (PSI), and for example, receive and decode a PSI section, a program and service information protocol (PSIP) section or a service information (SI) section, and the like, de-multiplexed in de-multiplexer 115.

In addition, the PSI & (PSIP and/or SI) decoder 114 may decode the received sections, create a database of the service information, and store the database of the service information into SI & metadata DB 121.

The audio/video decoder 116, 117 may decode video data and audio data in the de-multiplexer 115, and the user may be provided with the decoded audio data and video data through the display unit 118.

Meanwhile, the UI manager 124 and the service manager 123 may manage the overall state of the image display apparatus 100, provide a user interface, and manage another manager. For example, the UI manager 124 may provide a graphic user interface (GUI) for the user by using the on screen display (OSD), and perform the operation of the receiver according to key input form the user. In addition, when the UI manager receives the key input with regard to the channel selection from the user, the UI manager 124 may transmit the key input signal to service manager 123.

The service manger 123 may control managers associated with services such as a service delivery manager 113, the service discovery manager 120, the service control manager 119 and metadata manager 122. In addition, the service manager 123 may create the channel map and select the channels by using the channel map according to the received key input from the user interface manager 124.

Further, the service manager 123 may receive the service information of the channel from the PSI & (PSIP and/or SI) decoder 114, and set an audio/video packet identifier (PID) of the selected channel to de-multiplexer 115.

The service discovery manager 120 may provide the information necessary to select the service provider providing the service. For example, the service discovery manager 120 may find the service by using the received signal when receiving a signal relative to channel selection from the service manager 123.

Meanwhile, the service control manager 119 is responsible for selecting and controlling of a service. For example, the service control manager 119 may select and control the service by using an IGMP or RTSP when the user selects a live broadcasting service such as the existing broadcasting manner, and by using an RTSP when selecting a service such as the video on demand (VOD).

The RTSP protocol may provide a trick mode for the real-time streaming, and the service control manager 119 may initiate and manage a session through an IMC gateway using an IP multimedia subsystem (IMS) and a session initiation protocol (SIP).

The metadata manager 122 may manage a metadata associated with a service and store the metadata in SI & Metadata DB 711. In addition, SI & Metadata DB 121 may store the information necessary to select the service information decoded by the PSI & (PSIP and/or SI) decoder 114, the metadata managed by the metadata manager 122, and the service provider provided by the service discovery manager 120.

Further, the SI & Metadata DB 121 may store a setup data and the like for a system. For example, the SI & Metadata DB 121 may be implemented by a nonvolatile memory (NVRAM) or flash memory, and the like. The IG 750 may be a gateway gathering functions necessary to access an IMS-based IPTV service.

Figure 5:
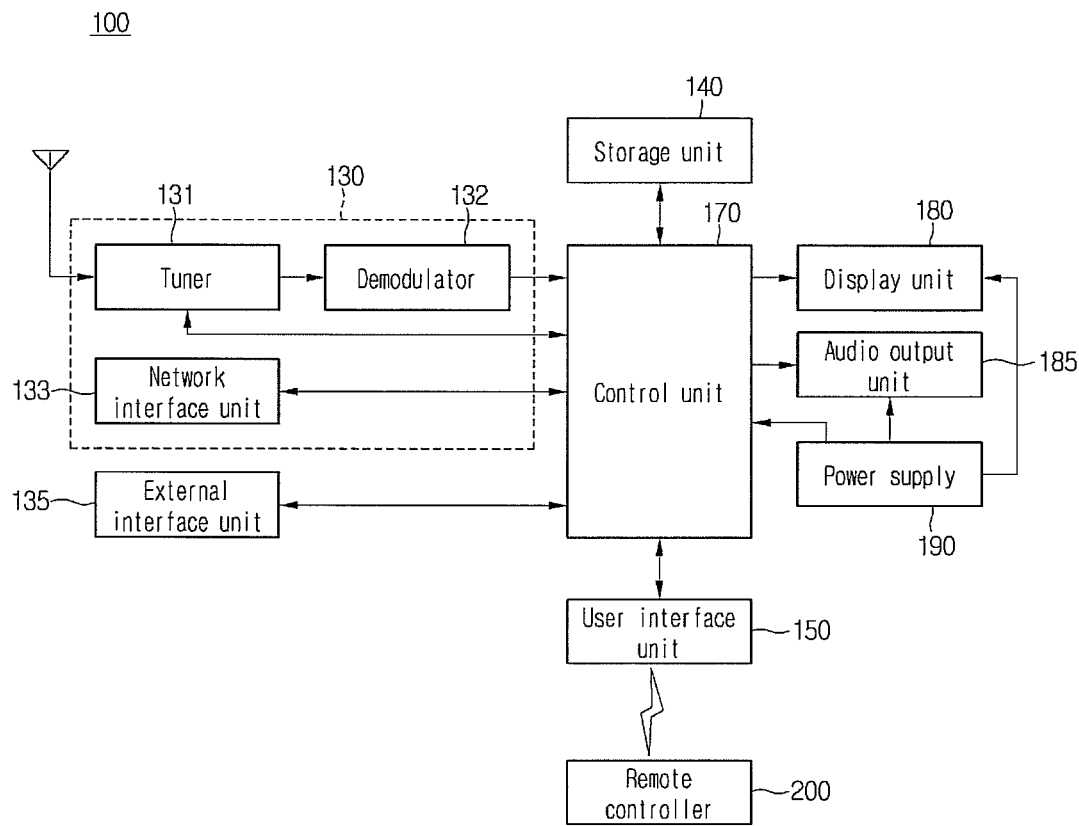
FIG. 5 shows another example of the display apparatus.

FIG. 5 is a block diagram showing the configuration of an image display apparatus according to another embodiment. Referring to FIG. 5, the image display apparatus 100 may include a broadcast receiving unit 130, an external interface unit 135, a storage unit 140, a user input interface unit 150, a control unit 170, a display unit 180, an audio output unit 185 and a power supply 190. Meanwhile, the broadcast receiving unit 130 may include a tuner 131, a demodulator 132 and a network interface unit 133.

The tuner 131 may select RF broadcasting signals corresponding to the selected channel by the user or all channels already stored among radio frequency (RF) broadcast signals received via antenna, and convert the selected RF broadcast signals into intermediate frequency signals or baseband images or audio signals.

For example, when the selected RF broadcast signal is a digital broadcast signal, the tuner 131 may convert the selected RF broadcast signal into a digital IF signal (DIF), when the selected RF broadcast signal is an analog broadcast signal, the tuner 131 may convert the selected RF broadcast signal into an analog baseband image or an audio signal (CVBS/SIF).

That is, the tuner 131 may process both of the digital broadcast and analog broadcast signals. Further, the analog baseband image or the audio signal CVBS/SIF output from the tuner 131 may be directly input to the control unit 170.

In addition, the tuner 131 may receive RF broadcast signals of a single carrier according to advanced television system committee (ATSC) way or, RF broadcast signals of a plurality of carriers according to Digital Video Broadcasting) (DVB) way.

Meanwhile, the tuner 131 may sequentially select the RF broadcast signals of all broadcast channels stored through the channel memory function among RF broadcast signals received by an antenna and convert the selected signals into intermediate frequency signals or baseband video or audio signals.

The demodulator 132 may receive the converted digital IF signal DIF from the tuner 131 to perform the demodulation operation. For example, when digital IF signal output from the tuner 131 is ATSC system, the demodulator 132 may perform 8-vestigial side band (8-VSB) demodulation.

In addition, the demodulator 132 may perform the channel decoding. To this end, the demodulator 132 may perform a trellis decoding, a de-interleaving and a reed-solomon decoding by including a Trellis Decoder, a De-Interleaver, a Reed Solomon Decoder, and the like. For example, when digital IF signal output from the tuner 131 is DVB system, the demodulator 132 may perform Coded Orthogonal Frequency Division Modulation (COFDMA) demodulation.

In addition, the demodulator 132 may perform the channel decoding. To this end, the demodulator 132 may perform a convolution decoding, a de-interleaving and a reed-solomon decoding by including a Convolution Decoder, a De-Interleaver, a Reed Solomon Decoder, and the like.

The demodulator 132 may output a stream signal (TS) after the demodulating and channel decoding. The stream signal may be multiplexed signal multiplexing the video signal, audio signal or data signal. For example, the stream signal may be multiplexed MPEG-2 transport stream (TS) multiplexing MPEG-2 standard video signal, audio signal of Dolby AC-3 standards, and the like. Specifically, the MPEG-2 TS may include 4-bytes header and 184 bytes payload. The demodulator 132 may separately include an ATSC demodulator and a DVB demodulator according to ATSC system or DVB system The stream signal output from the demodulator 132 may be input to the control unit 170. Further, the control unit 170 may output the video to the display unit 180 and output the audio to the audio output unit 185, respectively, after performing the de-multiplexing, the video and audio signal processing, and the like.

The external interface unit 135 may connect an external device and the image display apparatus 100. To this end, the external interface unit 135 may include A/V input and output unit or wireless communication unit and the like.

The external interface unit 135 may be connected to the external devices such as a Digital Versatile Disk (DVD), a Blu-ray, a game device, a camera, a camcorder, a computer (notebook), and the like through wired or wireless. In addition, the external interface unit 135 may transmit the video, audio or data signal input from the outside through the connected external device to the control unit 170 of the image display apparatus 100 and output the proceed video, audio or data signal in the control unit 170 to the connected external device.

The A/V input and output unit may include a USB terminal, a composite video banking sync (CVBS) terminal, a component terminal, S-video terminal (analog), a digital visual interface (DVI) terminal, a high definition multimedia interface (HDMI) terminal, a RGB terminal, a D-SUB terminal and the like so as to input the video and audio signals of the external devices to the image display apparatus 100.

Meanwhile, the wireless communication unit may perform short-range communications with other electronic devices. For example, the image display apparatus 100 may be connected to the network with other electronic devices according to communication standards such as Bluetooth, Radio Frequency identification (RFID), Infrared Data Association (IrDA), Ultra Wideband (UWB), ZigBee, Digital Living Network Affiance (DLNA), and the like.

In addition, the external interface unit 135 may be connected to a variety of set-top boxes through at least one of the above-mentioned various terminals, and perform input and output operations with the set-top boxes. Also, the external interface unit 135 may receive applications or application lists in adjacent the external devices and transmit the received applications or application lists to the control unit 170 or the storage unit 140.

The network interface unit 133 may provide an interface for connecting the image display apparatus 100 to a wired or wireless network including Internet. For example, the network interface unit 133 may include an Ethernet terminal for connection to a wire network, and the like, and connect to the wireless network by using Wireless LAN (WLAN) (Wi-Fi), Wireless broadband (Wibro), World Interoperability for Microwave Access (Wimax), High Speed Downlink Packet Access (HSDPA) communication standards, and the like.

Meanwhile, the network interface unit 133 may transmit or receive data to and from another user or another electronic device through a connected network or another network linked to the connected network. A portion of content data stored in the image display apparatus 100 may be transmitted to a selected user or a selected electronic device among another user or another electronic device already registered in the image display apparatus 100.

Also, the network interface unit 133 may access a predetermined Web page through a connected network or another network linked in the connected network. That is, by connecting to the predetermined Web page through the network, data may be transmitted or received to or from the corresponding server.

In addition, the network interface unit 133 may receive contents or data provided by content providers or network operators. That is, the network interface unit 133 may receive contents such as movies, advertising, games, VOD, broadcast signals, and the like and information associated with the contents, which are provided by content providers or network operators through the network.

In addition, the network interface unit 133 may receive update information or update files of firmware provided by network operators, and transmit the data internet or content providers or network operators. The network interface unit 133 may select and receive desired applications of opened applications in the air through the network.

The storage unit 140 may store programs for processing and controlling each of the signals in the control unit 170 and store the processed video, audio and data signals Further, the storage unit 140 may temporarily serve to store video, audio or data signals input from the external interface unit 135 or the network interface unit 133 and store information associated with the predetermined broadcast cannel through the channel memory function.

The storage unit 140 may store applications or application lists input from the external interface unit 135 or the network interface unit 133. The storage unit 140 may include, for example, at least one type of storage medium such as a flash memory type, a hard disk type, a multimedia card micro type, a card type (for example, SD or XD memories, and the like), a RAM, a ROM (EEPROM), or the like.

The image display apparatus 100 may reproduce content files (video files, still image files, music files, document files, application files, etc.) stored in the storage unit 140 and provide the reproduced content files to the users.

The user input interface unit 150 may transmit input signals input by the user to the control unit 170 or, transmit the signals from the control unit 170 to the user. For example, the user input interface unit 150 may process to receive control signals such as power on/off, channel selection, screen setting, and the like from the remote control device 200 according to the radio frequency (RF) communication standard or the infrared (IR) communication standard or process to transmit control signals from the control unit 170 to the remote control device 200.

In addition, the user input interface unit 150 may transmit the control signals input from local key (not shown) such as power key, channel key, volume key, setting key, and the like to the control unit 170. For example, the user input interface unit 150 may transmit the control signal input from a sensing unit (not shown) to sense the user's gestures to the control unit 170, or transmit signals from the control unit 170 to the sensing unit (not shown). Meanwhile, the sensing unit (not shown) may include a touch sensor, an audio sensor, a position sensor, a motion sensor, and the like.

The control unit 170 may de-multiplex streams input from the tuner 131 or the demodulator 132 or the external interface unit 135, or process the de-multiplexed signals, and produce and output the signals for video or audio output. The processed video signal in the control unit 170 may input the display unit 180, and display an image corresponding to the video signal. Further, the processed video signal from the control unit 170 may be input to the external output device through external interface unit 135.

Further, the processed audio signal from the control unit 170 may be output to the audio output unit 185. Further, the processed audio signal from the control unit 170 may be input to the external output device through external interface unit 135.

Although not shown in FIG. 5, the control unit 170 may include a de-multiplexer, image processing unit, and the like. In addition, the control unit 170 may control the overall operation within the image display apparatus 100. For example, the control unit 170 may control to tune the RF broadcasting corresponding to a channel selected by the user or already stored channel by controlling the tuner 131.

In addition, the control unit 170 may control the image display apparatus 100 by the user command through the user input interface unit 150 or an internal program. Further the control unit 170 may access to a network so that the user may download desired applications or application lists into the image display apparatus 100. For example, the control unit 170 may control the tuner 131 so as to input the signal of the selected channel according to predetermined channel selection command received through the user input interface unit 150 and process video, audio or data signals of the selected channel.

The control unit 170 may serve to output channel information, and the like selected by the user together with the processed video or audio signals through the display unit 180 or the audio output unit 185.

In addition, the control unit 170 may serve to output the video or audio signals from the external devices, which is a camera or camcorder, received through external interface unit 135, through the display unit 180 or the audio output unit 185, according to the external image reproducing command received through the user input interface unit 150.

Also, the control unit 170 may control the display unit 180 to display the image For example, the control unit 170 may control to display broadcasting image input through the tuner 131, or external input image input through the external interface unit 135, or image input through the network interface unit, or image stored in the storage unit 140. In this case, the image displayed on the display unit 180 may be moving image or still image, or 2D or 3D images.

In addition, the control unit 170 may control to reproduce contents stored in the image display apparatus 100, or received broadcast contents, and external input contents input from outside. The contents may be in various forms such as broadcast image, external input image, audio file, still image, a connected web screen, and a document file.

The control unit 170 may control to display a home screen on display unit 180 according to an input of movement into the home screen. The home screen may include a plurality of card objects classified by each of the content sources. The card object may include at least one content, for example, which may be a card object indicating a thumbnail list of the broadcast channel, a card object indicating the broadcast guide list, a card object indicating a broadcast reservation list and a record list, a card object indicating a media list in the image display apparatus or a device connected to the image display apparatus and the like. In addition, a card object indicating a connected external device list, a card object indicating a list associated with call and the like are further display on the home screen. In addition, the home screen may further include an application menu having at least one executable application item.

Meanwhile, when inputting a movement of a card object, the control unit 170 may control to display a card object representing by moving the card object or a card object not representing on display unit 180, on display unit 180 by movement.

When a predetermined card object of a plurality of the card objects in the home screen is selected, the control unit 170 may control to display an image corresponding to the card object on the display unit 180.

The control unit 170 may control to display a received broadcast image and an object representing information associated with the broadcast image to the card object representing the broadcast image. In addition, such a broadcast image may control to fix its size by lock setting.

Further, the control unit 170 may control to display setup objects for at least one setting of video setting, audio setting, a screen setting, a schedule setting, a point setting of the remote control device, and a network setting within the home screen and to display objects for Login, Help, Exit items in an area of the home screen, within the image display apparatus.

Meanwhile, the control unit 170 may control so as to display an object representing the number of entire card objects or representing the number of card objects displayed on display unit 180 among the entire card objects in an area of the home screen. When a name of a card object within predetermined card objects of card objects displayed on display unit 180 is selected, the control unit 170 may control so as to display the corresponding card object as a full screen on the display unit 180.

When an incoming call is received in connected external device or image display apparatus, the control unit 170 may control to display by focusing a card object associated with the call among the plurality of the card objects or by moving the card object associated with the call into the display unit 180.

When entering into an application view item, the control unit 170 may control to display downloadable applications or application lists into the image display apparatus 100 or from the external network. The control unit 170 may also control so as to install or drive applications downloaded from external networks with various user interfaces. In addition, images associated with the performed application may be controlled to be displayed on display unit (180) by the user' selection.

Meanwhile, although not shown in FIG. 5, the image display apparatus 100 may further include a channel browsing processing unit which generates the thumbnail image corresponding to the channel signal or the external input signal. The channel browsing processing unit may receive stream signal TS output from demodulator 132 or stream signal output from the external interface unit 135 and extract images from input stream signals to generate the thumbnail image.

The generated thumbnail images may be input to the control unit 170 as it is or in being encoded, or in being encoded in the form of a stream. The control unit 170 may control to display thumbnail lists including a plurality of the thumbnail images on the display unit 180 by using the input thumbnail images, and the thumbnail images in the thumbnail list may be updated in turn or simultaneously. Accordingly, the user may easily identify information of the plurality of the broadcast channels.

The display unit 180 may generate driving signals by converting image signals, data signals, OSD signals processed from the control unit 170 or image signals, data signals, and the like received from the external interface unit 135 into R, G, B signals, respectively. To this end, the display unit 180 may use a PDP, a LCD, an OLED, a flexible display, a 3D display and the like, or input device which consists of a touch screen in addition to the output device is also possible.

The audio output unit 185 may receive and output speech processed signals, for example, stereo signal, 3.1 channel signal or 5.1 channel signal by voice, which is implemented using speakers of the various types.

Meanwhile, the image display apparatus 100 may further include an imaging unit (not shown) for acquiring image of the user, and the image information acquired from the imaging unit (not shown) may be input to the control unit 170. In this case, the control unit 170 may sense the user' gestures by imaged image from the imaging unit (not shown) or sensed signal from the sensing unit (not shown), separately or in combination.

The power supply 190 may supply power to the image display apparatus 100 throughout, for example, the control unit 170, the display unit 180 and the audio output unit 185, which are implemented in the form of System On Chip (SOC).

To this end, the power supply 190 may include a convertor (not shown) converting AC power to DC power. Further, when the display unit 180 is implemented as LCD panel provided with a plurality of backlight lamps, the power supply 190 may further include a inverter (not shown) available for a PWM operation to drive a luminance adjusting or dimming.

The remote control device 200 transmits the user input to the user input interface unit 150. To this end, the remote control device 200 may use Bluetooth, Radio Frequency (RF) communication, Infrared (IR) communication, Ultra Wide-band (UWB), ZigBee standards and the like. In addition, the remote control device 200 may receive image, voice or data signals, and the like output from the user input interface unit 150, and display their signals from the remote control device 200 or output voice or vibration.

The above mentioned image display apparatus 100 may be at least one digital broadcast receiver of a digital broadcast of ATSC system (8-VSB system), a digital broadcast of DVB-T system, a digital broadcast of ISDB-T system (BST-OFDM system), and the like, which are fixed type.

Because the image display apparatus 100 as shown FIG. 5 pertains to only one embodiment, some components may be integrated, added or omitted, depending on certain aspects of the actually implemented image display apparatus 100. That is, the image display apparatus 100 may be configured to integrate two or more components into one component or subdivide one component into two or more components, as necessary. In addition, since the functions performed by each block are intended to describe one embodiment, the scope of rights of the embodiments described herein is to be not limited to these specific operations or devices.

According to another embodiment, the image display apparatus 100 may receive and reproduce images through the network interface unit 133 or the external interface unit 135 without including the tuner 131 and demodulator 132 unlike shown in FIG. 5. For example, the image display apparatus 100 may be separately implemented by the image processing device such as set-top box for receiving contents according to the broadcast signal or various network services and content reproducing device to reproduce contents input from the image processing device 100.

In this case, a network service providing method, according to one embodiment to be described blow, may be performed by any one of an image processing device such as the separated set-top box or a content reproducing device including the display unit 180 and the audio output unit 185, as well as the image display apparatus 100 as described with reference to FIG. 5.

Figure 6:
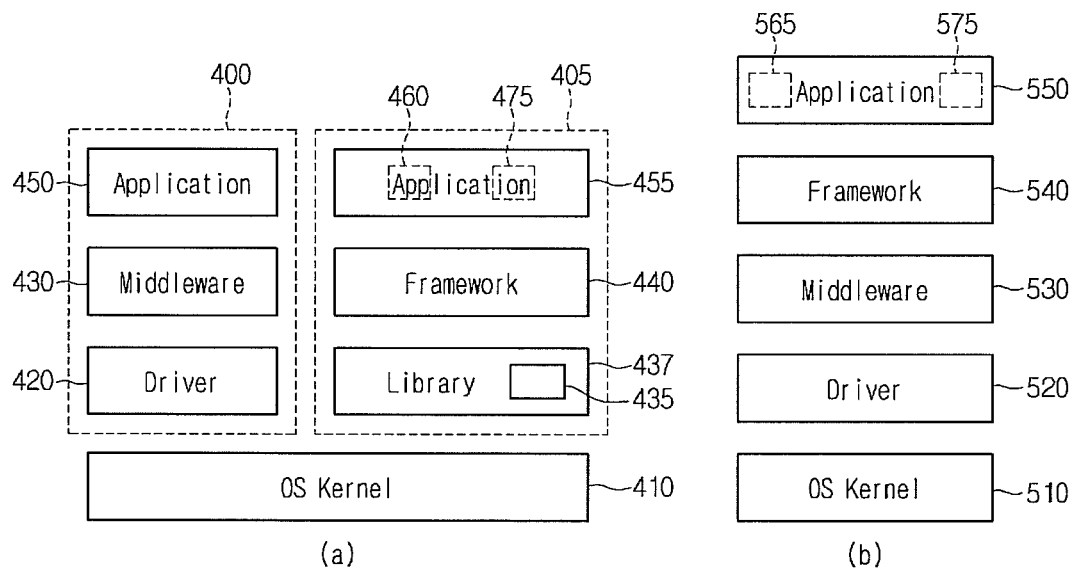
FIG. 6 shows one type of platform for the display apparatus.

FIG. 6 is showing embodiments of a platform structure of the image display apparatus, and the platform of the image display apparatus 100 may include OS-based software in order to perform various operations as described above.

Referring to FIG. 6A, the platform of the image display apparatus 100 may be separately designed by Legacy system platform 400 and Smart system platform 405, as detachable platforms. The OS Kernel 410 may be used in the Legacy system platform 400 and the Smart system platform 405 as a common, and the Legacy system platform 400 may include a driver 420, a middleware 430 and an application layer 450 on the OS Kernel 410. The Smart system platform 405 may include a library 435, a framework 440, and an application layer 455 on the OS Kernel 410

The OS Kernel 410, which is core of an operating system, may provide a hardware driver driving when driving the image display apparatus 100, hardware and processor' securities in the image display apparatus, efficient managements of the system resources, a memory management, an interface providing for hardware according to a hardware abstraction, a multi-process, a schedule management and a power management according to the multi-process, or the like.

For example, the hardware driver in the OS Kernel 410 may include at least one of a display driver, a WIFI driver, a Bluetooth driver, a USB driver, an audio driver, a power management, a binder driver, a memory driver, and the like. In addition, the hardware driver in the OS Kernel 410, which is a driver for hardware device in the OS Kernel 410, may include a character device driver, a block device driver and a network device driver.

The block device driver may include a buffer which holds by unit size as the data is transferred in a particular block unit, the character device driver may not include the buffer as described above as the data is transferred in a basic unit, that is, a character unit.

The OS Kernel 410 may be implemented as various operating system (OS)-based Kernel such as Unix-based (Linux), Window-based, and the like, and the opened OS Kernel may be available as universal in another electronic devices, and the like.

The driver 420 may be located between the OS Kernel 410 and the middleware 430 and may drive devices for operation of the application layer 450 in addition to the middleware 430. For example, the driver 420 may include drivers of a microcomputer (micom) in the image display apparatus 100, a display module, a graphic processing unit (GPU), a frame rate converter (FRC), a general purpose input/output pin, (GPIO), a HDMI, system decoder or de-multiplexer (SDEC), a video decoder (VDEC), an audio decoder (ADEC), a personal video recorder (PVR) or inter-integrated circuit (I2C), and the like. As mentioned above, the divers may be operated in conjunction with the hardware driver in the OS Kernel 410.

In addition, the driver 420 may further include a driver of the remote control device 200, for example, the driver of a space remote controller, the space remote controller may be variously included in the OS Kernel 410 or the middleware 430 in addition to the driver 420.

The middleware 430 may be located between the OS Kernel 410 and the application layer 450, and may serve to receive and transmit data between another hardware and software. Accordingly, a standardized interface may be provided, and supports of various environments and systems may be operated in conjunction with different tasks.

For example, the middleware 430 in the Legacy system platform 400 may be Multimedia and Hypermedia information coding Experts Group (MHEG) and Advance Common Application Platform (ACAP) which are middleware related to data broadcast, middleware of PSIP or SI which is related to broadcast information, or DLNA middleware which is related to peripherals communications, and the like.

The application layer 450 on the middleware 430, which is the application layer 450 within Legacy system platform 400, may include a User Interface Application related to various menus within the image display apparatus 100. The application layer 450 on the middleware 430 may be edited by the user's selection and updated through the network. By using the application layer 450, it is possible to enter a desired menu among various user interfaces in accordance with the input of the remote control device in viewing the broadcast image.

In addition, the application layer 450 within the Legacy system platform 400 may include at least one of a TV guide application, a Bluetooth application, a reservation application, a Digital Video Recorder (DVR) application, a Hotkey application.

The library 435 within the Smart system platform 405 may be located between the OS Kernel 410 and the framework 440, and the basis of the framework 440 may be formed. For example, the library 435 may include a Secure Socket Layer (SSL) which is a security-related library, a WebKit which is a web engine-related library, and a Media Framework which is media-related library such as a video format and an audio format, and be created based on C or C++ to be exposed to developers through the framework 440.

Also, library 435 may include a runtime 437 having a core java library and a Virtual Machine (VM), the runtime 437 may form the basis of the framework 440 in addition to the library 435. The Virtual Machine (VM) may be a virtual machine so as to perform a plurality of instances, that is, multi-tasking. Meanwhile, each virtual machine VM may be assigned and performed according to each application within the application layer 455. In this case, in order to adjust schedules between a plurality instances or to interconnect between the plurality of instances, a binder driver (not shown) within the OS Kernel 410 may be operated.

Also, or alternatively, a Java-based application and one or more C-based libraries may be connected each other by the binder driver and the runtime 437, and the library 435 and the runtime 437 may correspond to the middleware of the Legacy system.

The framework 440 within the Smart system platform 405 includes a program based on the application within the application layer 455. The framework 440 is compatible with any application and it is possible to reuse, move, or exchange the component. Also, the framework 440 may include supporting programs to be associated with other software components, for example, which may include a resource manager, activity manager related to an activity of application, a notification manager, a content provider summarizing information shared between applications, and the like.

The application layer 455 on the framework 440 includes a variety of programs which are displayed by being driven in the image display apparatus 100. For example, the application layer 450 may include Core-Application having at least one of e-mail, Short message service (SMS), a calendar, a map, a browser and the like. The framework 440 or the application layer 450 as described above may be created by based on JAVA.

In addition, the application layer 455 may be divided into an application 465, which is stored in the image display apparatus 100 and may be un-deleted by the user, and an application 475, which is downloaded through the external device or network and stored in the image display apparatus 100 and may be mounted or deleted.

An Internet phone service, Video On Demand (VOD)service, Web album service, Social Networking Service SNS, Location-based Service (LBS),a map service a Web search service, an application search service may be performed by the application in the application layer 455. In addition, various functions such as games, schedule managements, and the like may be performed.

Meanwhile, as shown in FIG. 6B, the platform of the image display apparatus 100, as an integrated platform, may include an OS Kernel 510, a driver 520, a middleware 530, a framework 540 and an application layer 550. In the platform shown in FIG. 6B, when compared to that shown in FIG. 6A, the library 435 is omitted, there are differences that the application layer 550 is integrated layer, and the driver 520 and the framework 540 may be the same.

The platform in shown FIGS. 6A and 6B may be used for general purposes in various electronic devices as well as the image display apparatus 100, and may be stored and loaded in a separate processor as well as storage unit 140 or control unit 170. In addition, the platform may be stored or loaded in the SI & metadata DB 711, UI manager 714, and service manager 713 shown in FIG. 4 and may further include a separate application processor (not shown) for performing the application.

Figure 7:
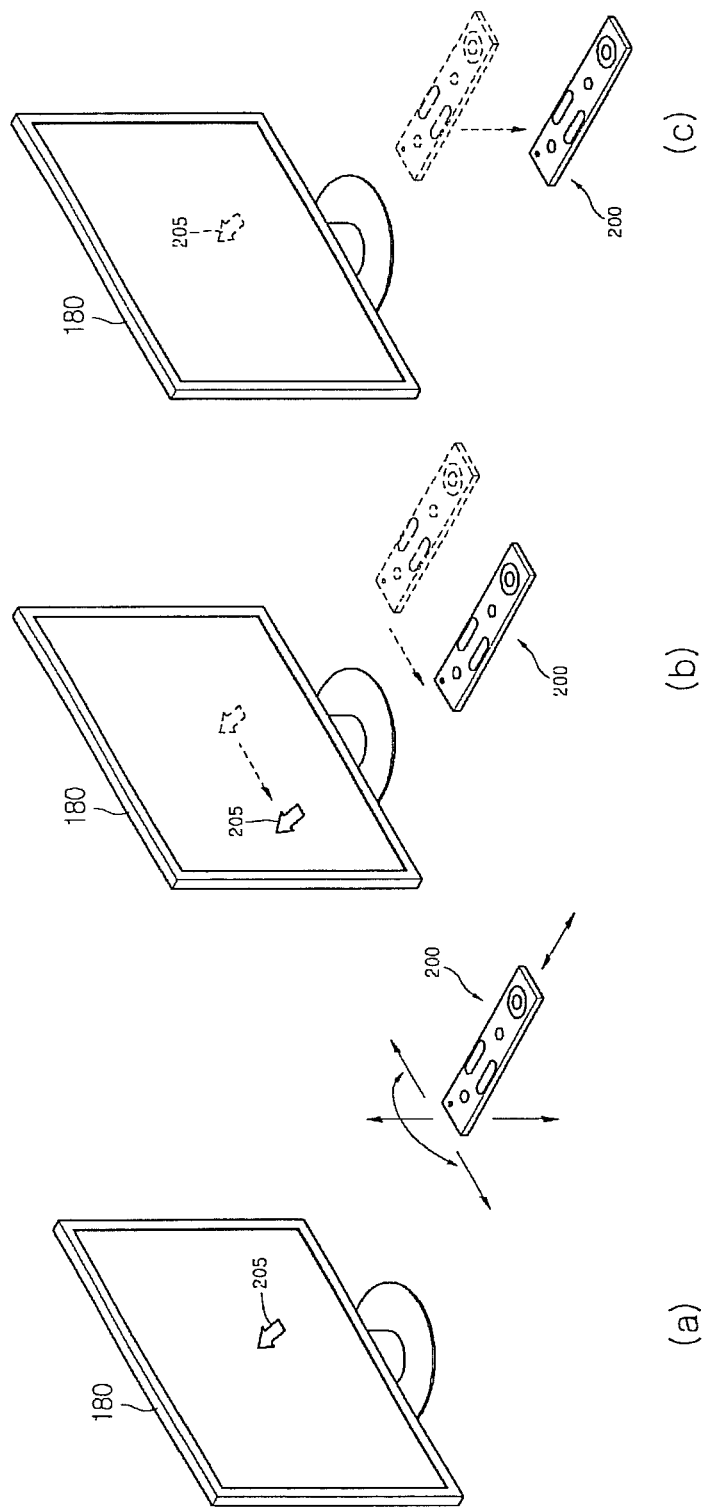
FIG. 7 shows a first embodiment of a method for controlling operation of the display apparatus using a remote control device.

FIG. 7 is a diagram showing a first embodiment of a method of controlling the operation of an image display apparatus using a remote control device.

As shown in FIG. 7A, a pointer 205 corresponding to the remote control device 200 is displayed in the display unit 180. The user may move or rotate the remote control device 200 in all directions. The pointer 205 in displayed in the display unit 180 of the image display apparatus correspond to the movement of the remote control device 200. Since the corresponding pointer 205 is moved and displayed according to the movement on 3D space, the remote control device 200 may be named as the spatial remote controller.

As shown in FIG. 7B, when the user moves the remote control device 200 to the left, the pointer 205 displayed on the display unit 180 is also moved to the left correspondingly. The movement of the remote control device 200 sensed by a sensor of the remote control device 200 is transmitted to the image display apparatus. The image display apparatus may calculate the coordinates of the pointer 205 from the information on the movement of the remote control device 200. The image display apparatus may display the pointer 205 corresponding to the calculated coordinates.

As shown in FIG. 7C, the user may move the remote control device 200 to be away from the display unit 180 while pressing a certain button on the remote control device 200. Thereby, the selected area on the display unit 180 corresponding to the pointer 205 is zoomed in. In contrast, when the user move the remote control device 200 to be closer to the display unit 180, the selected area on the display unit 180 corresponding to the pointer 205 is zoomed out.

When the remote control device 200 is away from the display unit 180, the selected area may be zoom out, and when the remote control device 200 is closer to the display unit 180, the selected area may be zoom in.

In addition, in a state where a certain button in the remote control device 200 is pressed, the recognition of the movement in all direction may be excluded. That is, when the remote control device 200 is moved be to away or closer from the display unit 180, the up, down, left, and right movements are not recognized and only the forth and the back movements may be recognized. In a state where a certain button of the remote control device 200 is not pressed, only the pointer 205 is moved according to the up, down, left and right movements. The movement speed or direction of the pointer 205 may be corresponded to the movement speed or direction of remote control device 200.

The pointer described in the specification corresponds to the operation of the remote control device 200 and means a object to be displayed in the display unit 180. Therefore, the pointer 205 is represented by the arrow shape in the drawing, but objects of various shapes may be used. For example, the pointer 250 may include a point, a cursor, a prompt, a thick outline and the like. In addition, the pointer 205 may be displayed according to a point of any one of the vertical axis and the horizontal axis on the display unit 180. Further, the pointer 205 may be displayed according to a plurality of points such as a line, a surface and the like.

Figure 8:
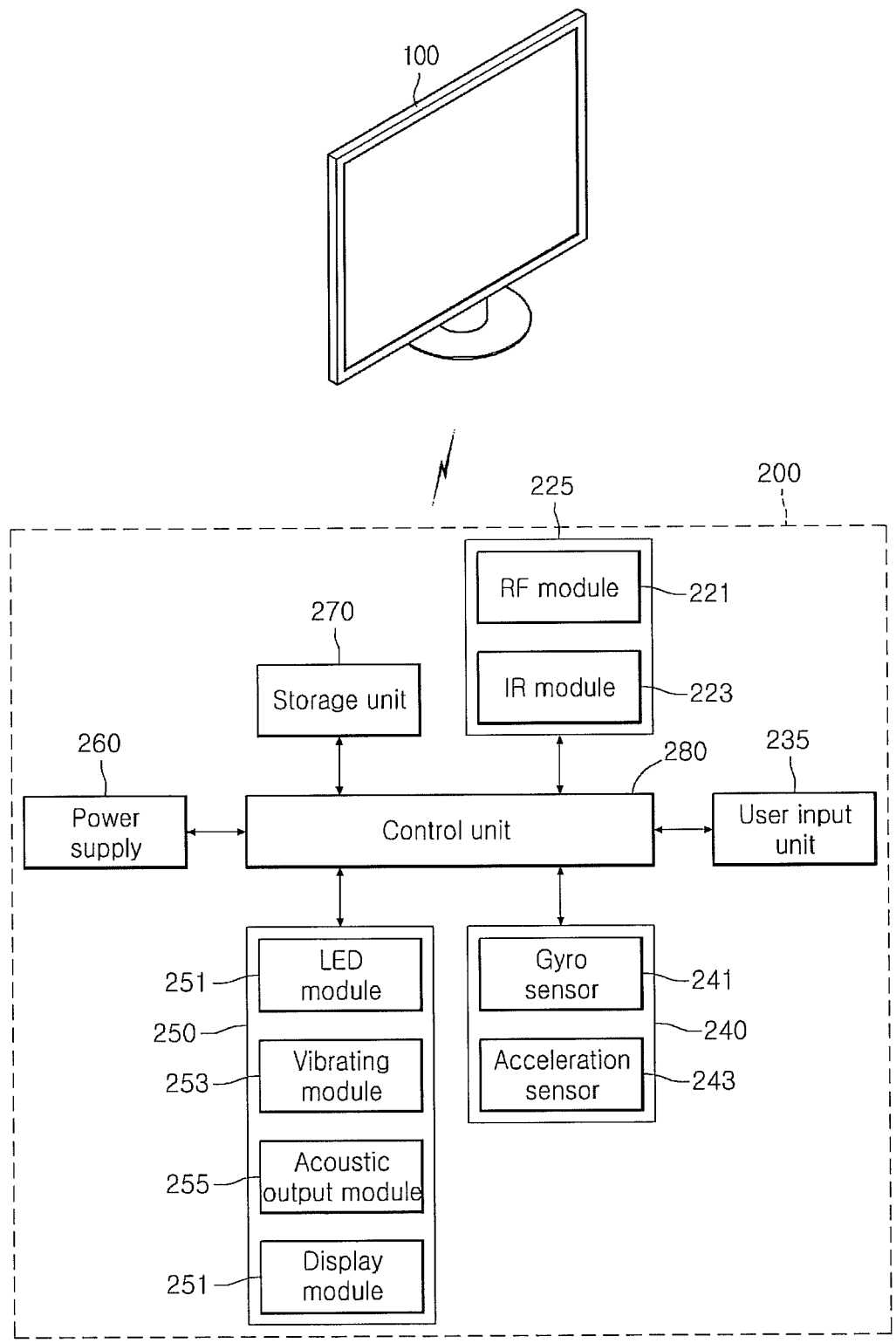
FIG. 8 shows a first embodiment of the remote control device.

FIG. 8 is a block diagram showing a first embodiment of a configuration of a remote control device. The remote control device 200 may include a wireless communication unit 225, a user input unit 235, a sensor 240, an output unit 250, a power supply 260, a storage unit 270 and a control unit 280. The wireless communication unit 225 may transmits and receive any one of signals in the image display apparatus.

The remote control device 200 may include a RF module 221 which may transmit and receive signals to or from the image display apparatus 100 in accordance with the RF communication standard and an IR module 223 which may transmit and receive signals to or from the image display apparatus 100 in accordance with the IR communication standard.

In addition, the remote control device 200 transmits signal including information such as movements, and the like of the remote control device 200 to the image display apparatus 100 through the RF module 221.

The remote control device 200 may receive signals transmitted by the image display apparatus 100 through the RF module 221 and transmit commands regarding power on/off, a channel change, a volume change, and the like to the image display apparatus 100 through the IR module 223, if necessary.

The user input unit 235 may include a keypad, a buttons, a touch pad or touch screen, and the like. The user may input the command associated with the image display apparatus 100 to the remote control device 200 by operating the user input unit 235. When the user input unit 235 includes a hardkey button, the user may input the command associated with the image display apparatus 100 to the remote control device 200 through a push operation of the hardkey button.

When the user input unit 235 includes the touch screen, the user may input the command associated with the image display apparatus 100 to the remote control device 200 by touching a soft key of the touch screen. In addition, according to one embodiment, the user input unit 235 may include input units of various kinds such as a scroll key, a jog key and the like which may be operated by the user.

The sensor 240 may include a gyro sensor 241 or an acceleration sensor 243, and the gyro sensor 241 may detect information regarding the movements of the remote control device 200. For example, the gyro sensor 241 may detect information regarding the operation of the remote control device 200 according to x, y and z axis, and the acceleration sensor 243 may detect information regarding the movement speed, and the like of the remote control device 200. Meanwhile, the remote control device 200 may further include a distance measuring sensor, and detect a distance from the display unit 180 of the image display apparatus 100.

The output unit 250 may output image or voice signals corresponding to operation of the user input unit 235 or corresponding to signals transmitted from the image display apparatus 100. The user may recognize whether the user input unit 235 is operated or whether image display apparatus 100 is controlled, through output unit 250.

For example, the output unit 250 may include a lighting LED module 251, a vibrating module 253, an acoustic output module 255, or an image output module 257 when the user input unit 235 is operated, or signals are transmitted and received to or from the image display apparatus 100 through the wireless communication unit 225.

In addition, the power supply 260 may supply power to the remote control device 200 and not supply power when the remote control device 200 is still for a predetermined time, such that the waste of power may be reduced. The power supply 260 may resume power when a predetermined key provided in the remote control device 200 is operated.

The storage unit 270 may store various types of programs, application data, and the like required to control or operate of the remote control device 200. When the remote control device 200 transmits and receives signals through the image display apparatus 100 and the RF module 221 by a wireless, the remote control device 200 and the image display apparatus 100 transmit and receive signals through a predetermined frequency band.

The control unit 280 of the remote control device 200 may store and refer to information regarding frequency bands in the storage unit (270), and the like capable of transmitting or receiving signals to or from the image display apparatus 100 paired with the remote control device 200 by a wireless.

The control unit 280 controls matters associated with the control of the remote control device 200. The control unit 280 may transmits signals corresponding to a predetermined key operation of the user input unit 235 or corresponding to the movement of the remote control device 200 detected from the sensor 240 to the image display apparatus 100 through the wireless communication unit 225).

Figure 9:
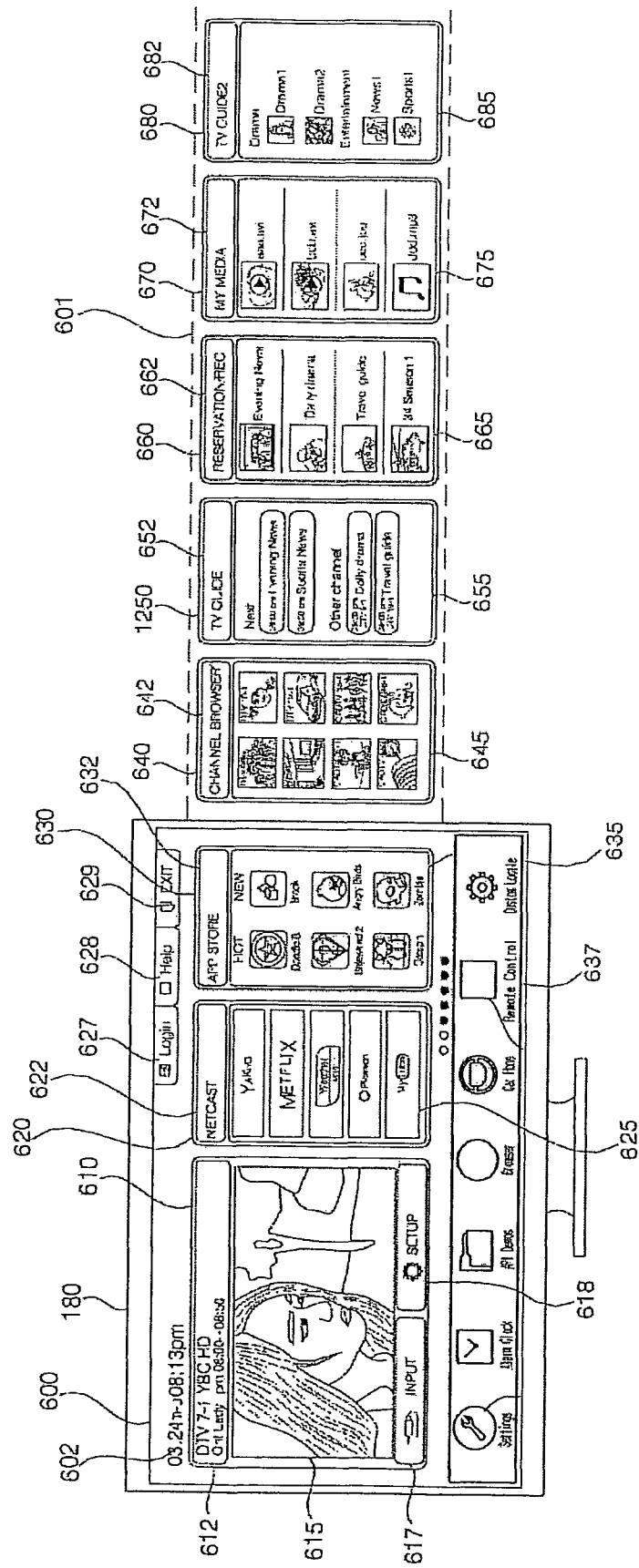
FIG. 9 shows a first embodiment of a home screen of a display apparatus.

FIG. 9 is a diagram showing a first embodiment of a home screen configuration displayed on an image display apparatus. The home screen configuration shown in FIG. 9 may be an example of the basic screen configuration of the image display apparatus 100 described above. Further, such a screen may be set to an initial screen or a basic screen by the operation of a local key or a home key provided in the remote control device 200 when power is on, or power is on in standby mode.

The home screen 600 may include a card object area, and the card object area may include a plurality of card objects 610, 620, 630 separated by each source of contents. As shown in FIG. 9, according to one example, a card object (BROADCAST) 610 representing broadcast image, a card object (NETCAST) 620 representing content provider (CP) list, and a card object (APP STORE) 630 representing an application provider (CP) list may be displayed on the display unit 180.

The card object (APP STORE) 630 representing an application provider (CP) list may include information regarding a plurality of applications downloadable from the service provider 20. For example, the card object (APP STORE) 630 may include a plurality of icons each corresponding to the applications.

In addition, the drawing illustrates, as card objects which is disposed in a hidden area not shown in the drawing and displayed by a replacement when the card object is moved, a card object (CHANNEL BROWSER) 640 representing a thumbnail list of the broadcast channel, a card object (TV GUIDE) 650 representing a broadcast guide list, a card object (RESERVATION/REC) 660 representing a broadcast reservation list or a recording list, a card object (MY MEDIA) 670 representing a media list in devices connected to the image display apparatus or within the image display apparatus, and a card object (TV GUIDE2) 680, and the like.

The card object (BROADCAST) 610 which represents broadcast image may include broadcast image 615 received through the tuner 110 or the network interface unit 130, an object 612 representing the corresponding broadcast image-related information, an object 617 representing the external device, and a set up object 618.

The broadcast image 615 may be displayed as the card object, and its size is fixed by a lock function, such that the user may view the broadcast image in succession. The broadcast image 615 may be adjusted in terms of its size by operation of the user. For example, the size of the corresponding broadcast image 615 may be enlarged or reduced by a drag using the pointer 205 of the remote control device 200. By the enlargement or reduction, the number of the card object displayed on the display unit 180 may be two or four, and the like instead of three as shown in drawing. When the broadcast image 615 within the card object is selected, the corresponding broadcast image is displayed on display unit 180 as a full screen.

The object 612 which represents information related to the corresponding broadcast image may include channel number (DTV7-1), a channel name (YBC HD), a broadcast program name (Oh! Lady), broadcast time (pm 08:00~8:50), and the like. Thereby, the user may intuitively understand information regarding the broadcast image 615 to be displayed. When the object 612 which represents the information related to the corresponding broadcast image is selected, the associated EPG information may be displayed on display unit 180.

The object 602 which represents Date (03.24), Day (THU) and current time (pm 08:13) may be displayed on the card object 610 which represents the broadcast image. Thereby, the user may intuitively understand the time information.

The object 617 representing the external device may represent the external device connected to the image display apparatus 100. For example, when the corresponding object 617 is selected, the list of the external device connected to the image display apparatus 100 may be displayed.

The set up object 618 may be used to input various settings of the image display apparatus 100. For example, various settings such as an image setting, an audio setting, a screen setting, a reservation setting, a pointer setting of the remote control device 200, a network setting, and the like may be performed.

The card object 620 which represents the content provider (CP) list may include a card object name (NETCAST) 622 and a content provider list 625. The content provider within the content provider list 625 is illustrated as Yahoo, Metflix, weather.com, Picason, My tube, and the like, but various settings are possible. When the card object name 622 is selected, the corresponding card object 620 is displayed on display unit 180 as a full screen.

When the content provider within the content provider list 625 is selected, the screen including the content list provided by the corresponding content provider may be displayed on the display unit 180.

The card object 630 which represents the application providing list may include a card object name (APP STORE) 632 and an application list 635. The application list 635 may be a list classified and sorted for each item in the application store. In the drawing, the popular order (HOT), the newest order (New), and the like are illustrated, but these are only provided as examples as other applications may be included, sorted, and/or classified. When the card object name 632 is selected, the corresponding card object 630 is displayed on display unit 180 as a full screen.

A predetermined application item within the application list 635 is selected, and the screen which provides information regarding the corresponding application may be displayed on the display unit 180.

A login item 627, a help item 628 and an exit item 629 may be displayed on the upper part of the card object 620, 630. The login item 627 may be used at login of the network where an application store or an image display apparatus is connected. The help item 628 may be used to help during the operation of the image display apparatus 100. The exit item 629 may be used when trying to exit from the corresponding home screen. At this time, the received broadcast image may be displayed as full screen.

The object 637 which represents the number of the entire card object may be displayed on the lower part of the card object 620, 630. The object may represent the number of entire card objects as well as the number of the card object displayed on the display unit 180 among the entire card objects.

The card object 640 which represents the thumbnail list of the broadcast channel may include a card object name (CHANNEL BROWSER) 642 and a thumbnail list 645 of the broadcast channel. In the drawing, for illustrative purposes, the broadcast channels sequentially received are represented as the thumbnail image. According to one embodiment, the thumbnail list may include one or more thumbnail images and channel information of corresponding channels. Thereby, the user may intuitively understand the contents of the corresponding channel.

The thumbnail images may be thumbnail images for favorite channels pre-registered by the user or thumbnail images for later or earlier channel of the broadcast image 615 within the card object 610. Meanwhile, eight thumbnail images are illustrated in the drawing, but various other numbers of images may be included. In addition, the thumbnail images in the thumbnail list may be updated.

When the card object name 642 is selected, a corresponding card object 640 is displayed on display unit 180 as a full screen. That is, the contents regarding the thumbnail list may be displayed on the display unit 180. When a predetermined thumbnail image within the thumbnail list 645 of the broadcast channel is selected, the broadcast image corresponding to the thumbnail image may be displayed on the display unit 180.

The card object 650 which represents the broadcast guide list may include a card object name (TV GUIDE) 652 and a broadcast guide list 655. The broadcast guide list 655 may be, for example, a list regarding the broadcast image of another channel or the broadcast program after the broadcast image 615 within the card object 610. When the card object name 652 is selected, the corresponding card object 650 is displayed on display unit 180 as a full screen.

When a predetermined broadcast item within the broadcast guide list 655 is selected, a broadcast image corresponding to the broadcast item may be displayed on the display unit 180, or the broadcast information corresponding to the broadcast item may be displayed on the display unit 180

The card object 660 which represents the broadcast reservation list or the recording list may include a card object name (RESERVATION/REC) 662 and the broadcast reservation list or the recording list 665. The broadcast reservation list or the recording list 665 may be a list including a broadcast item reserved in advance by the user or a broadcast item recorded accordingly. One or more thumbnail images may be included for each item. When the card object name 662 is selected, a corresponding card object 660 is displayed on the display unit 180 as a full screen In addition, when the broadcast reservation list, or the broadcast item reserved in advance by the user or the broadcast item recorded within the recording list 665 is selected, the broadcast information or recorded broadcast image may be displayed on the display unit 180.

The card object 670 which represents the media list may include a card object name (MY MEDIA) 672 and a media list 675. The media list 675 may be a media list within devices within the image display apparatus 100 or devices connected to the image display apparatus 100. In the drawing, the moving image, the still image, the audio, and the like are illustrated, but other content may be included in other embodiments. When the card object name 672 is selected, the corresponding card object 670 is displayed on display unit 180 as a full screen.

A predetermined media item within the media list 675 is selected, the corresponding media may be performed, and the screen corresponding to the media may be displayed on the display unit 180.

The card object (TV GIODE2) 680 which represents the broadcast guide list may include a card object name (TV GUIDE2) 682 and a broadcast guide list 685. The broadcast guide list 685 may be a guide list for each broadcast category. In the drawing, the list for each broadcast category classified by an entertainment such as news or sports is illustrated, but various examples are possible. That is, the list of the category may be a broadcast guide list for each category such as drama, movies, news, sports, animation, and the like. Thereby, the user may confirm the guide list classified by genre of the broadcast.

When the card object name 682 is selected, the corresponding card object 680 is displayed on display unit 180 as a full screen. And, when a predetermined application item within the application list 685 is selected, the screen corresponding to the broadcast image may be displayed on the display unit 180.

The card object 620, 830 displayed on the display unit 180, and the card objects 640, 650, 660, 670, 680 not displayed on the display unit 180 and located in a hidden area 601 are replaced by each other according to the movement input of the card object. That is, the least one of the card objects 620, 830 displayed on the display unit 180 may be moved to the hidden area 601, and the least one of the card objects 640, 650, 660, 670, 680 located in the hidden area 601 may be displayed on the display unit 180.

The home screen 600 of the image display apparatus 100 may further include a card object which represents information associated with a software upgrade.

According to one embodiment, the image display apparatus 100 is provided with a web browser to display specific web pages on the screen through the web browsing, wherein a plurality of thumbnail images each corresponding to a plurality of web pages already registered when the web browser application is selected are displayed on the screen and the corresponding web pages may be displayed depending on the selection of the thumbnail image.

One of the card objects or applications as described above may provide a service which remote controls the operation of the image display apparatus 100, and the remote control service may be used for diagnosing a state of the image display apparatus 100 or solving a problem such as failure in the image display apparatus 100.

Figure 10:
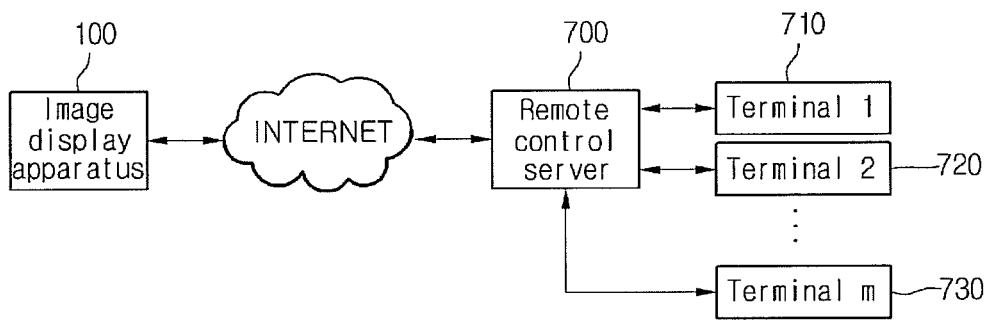
FIG. 10 shows one type of a remote control system for a display apparatus.

FIG. 10 is a block diagram showing a first embodiment of a remote control system configuration of an image display apparatus. The remote control system may include an image display apparatus 100, a remote control server 700 and a plurality of terminals 710 to 730.

The plurality of terminals 710 to 730 may remote control the operation of the image display apparatus 100 through the remote control server 700 connected by a communication network such as Local Area Network (LAN) or Internet. For example, when the image display apparatus 100 is connected to the remote control server 700 for the remote control service, the terminal 1 710 connected to the remote control server 700 receives an input for remote controlling the image display apparatus 100, and then, transmits signals corresponding to the input to the remote control server 700.

The remote control server 700 may perform the remote control service between the image display apparatus 100 and the terminal 1 710 by transmitting signals received from the terminal 1 710 to the image display apparatus 100 or by transmitting signals from the image display apparatus 100 to the terminal 1 710. More specifically, the terminal 1 710 may receive desired information for the image display apparatus 100 through the remote control server 700, or requires the image display apparatus 100 to perform specific function.

As the terminal 1 710 controls the image display apparatus 100 through the remote control service described above, it is possible to diagnose the image display apparatus 100 or remote solve a problem such as failure in the image display apparatus 100 To this end, each of the image display apparatus 100 and the terminals 710 to 730 may be provided with a program for providing the remote control service, and the application may be stored in a programmed memory (not shown) to perform the remote control service providing method to be described in detail later.

According to one embodiment, the image display apparatus 100 receives a command signal to require the performance of the specific function from the remote control server 700 through the internet, and the like, and generates and transmits a screen capture image to the remote control server 700 after performing the function corresponding to the received command signal.

The capture image may be transmitted to the terminal which remote controls the image display apparatus 100 through the remote control server 700 and displayed on the image display apparatus 100, accordingly, the user of the terminal, for example, the service agent trying to solve the problem of the image display apparatus 100 via the remote control may easily confirm the current state of the image display apparatus 100 and whether to be perform the normal functions, and the like.

Figure 11:
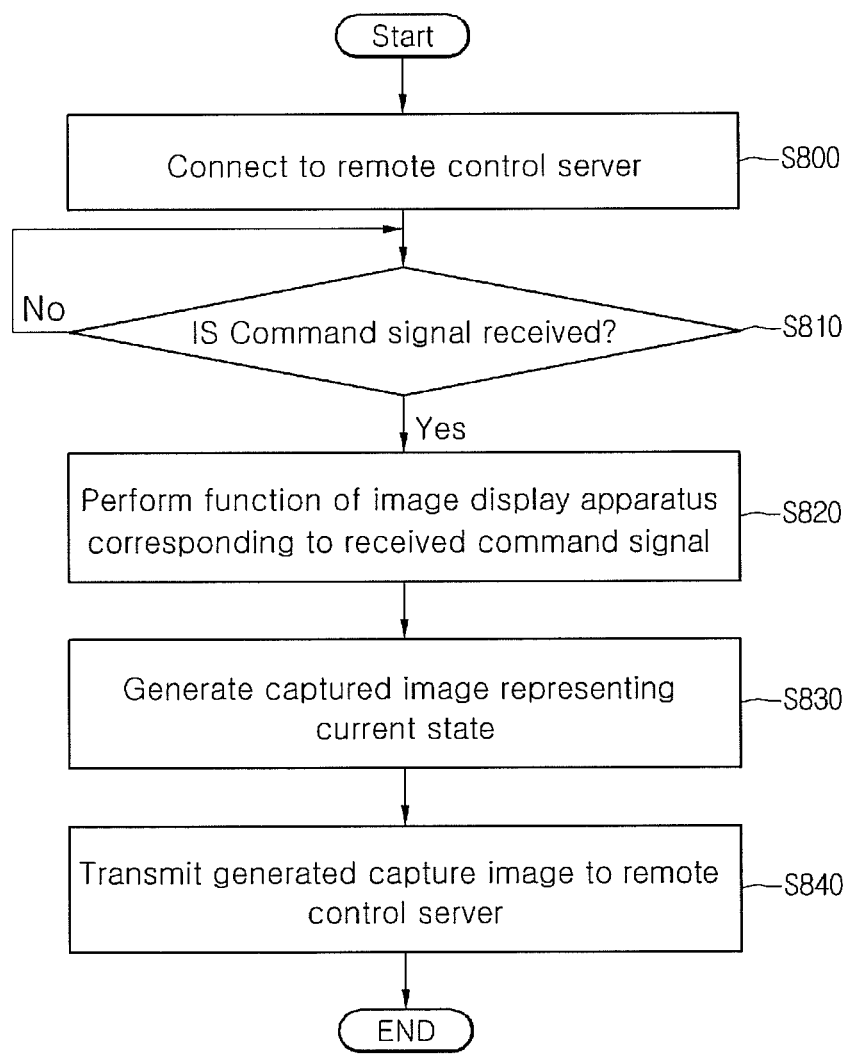
FIG. 11 shows one embodiment of a method for providing remote control service of a display apparatus.

FIG. 11 is a flow chart indicating a remote control service providing method of an image display apparatus 100 according to one embodiment, and the remote control service providing method will be described with reference to the image display apparatus 100 in shown in FIG. 5. Initially, a case where the terminal 1 710 shown in FIG. 10 controls the image display apparatus 100 through the remote control server 700 will be described.

Referring to FIG. 11, the image display apparatus 100 is connected to the remote control server 700 in response to the request of the remote control service input from the user (S800). For example, when the user input requiring the remote control service is received, through the user interface 150 included in the image display apparatus 100, the network interface unit 133 may be connected to the remote control server 700 according to the control of the control unit 170.

Subsequently, the image display apparatus 100 confirms whether a command signal requiring the performance of the specific function is received from the remote control server 700 (S810), performs the function corresponding to the received command signal from the remote control server 700.

For example, the terminal 1 710, which remote controls the image display apparatus 100, receives the specific function to be required for the image display apparatus 100 from the service agent performing the remote control service, and transmits information regarding the input function to the remote control server 700.

The remote control server 700 generates the command signal, which requires the function of the image display apparatus 100 corresponding to the received information, and transmits the command signal to the image display apparatus 100 via an Internet.

The network interface unit 133 of the image display apparatus 100 may receive the command signal from the remote control server 700, and the control unit 170 may perform the function of the image display apparatus 100 corresponding to the received command signal.

After performing the function, the control unit 170 generates a capture image representing a current screen state (S830), and transmits the generated capture image to the remote control server 700. For example, the control unit 170 may obtain the capture image by mixing video layer displayed on the screen and On Screen Display (OSD) layer data, and accordingly, the capture image represents the screen in which the user of the image display apparatus 100 is viewing as it is.

Since the capture image represents the screen displayed on the image display apparatus 100 after performing the function required by the terminal 1 710, when being transmitted and displayed by the terminal 1 710 via the remote control server, the service agent, who is the user of the terminal 1 710, may easily confirm whether the function requested by one's own self is normally performed in the image display apparatus 100.

Therefore, the service agent using the terminal 1 710 confirms the represented capture image while confirming whether the functions of the image display apparatus 100 are normally performed or whether there is a problem in operation of the image display apparatus.

After the confirmation of a problem, the service agent may attempt to solve the problem on the image display apparatus 100 by using a method of adjusting setting values of the image display apparatus 100 depending on the results of the confirmation, and the like. This may be accomplished in a variety of ways.

One way includes transmitting another command signal from terminal 1 170 (and/or an associated network server) to control at least one feature or setting of the image display apparatus 100 in an attempt to correct the error. When received, a processor of the image display apparatus may automatically control the at least one feature or setting indicated in the command signal. Subsequent steps may then include requesting and receiving a second captured image at terminal 1 170 to confirm whether the problem has been resolved.

Another way may include exchanging messages with the user through the network, instructing the user of the image display apparatus 100 what adjustments to make to correct the error. Still another way may involve speaking with the user of apparatus 100 to have the user manually make the adjustments.

FIGS. 12 to 21 shows embodiments of a method of connecting to a remote control server, and also show a user interface UI which is displayed in a process of connecting the image display apparatus 100 to the remote control server 700 in S800 of FIG. 10.

First, when a problem occurs during the operation of the image display apparatus 100, the user may perform the input operation for requesting the remote control service by using the remote control device 200. For example, the user may request the remote control service by using a key button input operation already set such as selecting "Home" button and "0325" the number buttons among keys included in the remote control device 200.

In another embodiment, the user dials a call center providing the remote control service by using separate communication devices such as wire and wireless telephone, such that the service agent may guide the user to receive an input operation, for example, "Home+0325" key button input for directly connecting to the remote control server 700.

In another embodiment, the image display apparatus 100 may download and install an application for providing the remote control service according to requests of the user, such that the user may connect the image display apparatus 100 to the remote control server 700 by performing a remote control service application installed in the image display apparatus 100.

For example, as shown in FIG. 9, the image display apparatus 100 may display an application menu 690, which is an object representing application items installed in the image display apparatus 100, on a home screen. The application menu 690 may include icons 691 each corresponding to the plurality of applications which may be downloaded by using "APPL STORE" object 630 and performed in the image display apparatus 100.

The application menu 690 may be an application easy view menu, such that a portion of the plurality of applications may be performed in the image display apparatus 100. Application items displayed in the application menu 690 may be edited to display frequently used applications by the user' setting.

As shown in FIG. 9, any one of icons included in the application menu 690 may be icon (Remote Control) 692 corresponding to a remote control service application for providing the remote control service. In this case, the user of the image display apparatus 100 may perform the remote control service application by the icon 692, and accordingly, the image display apparatus 100 may provide the remote control service by connecting to the remote control server 700.

According to the user input as described above, when the image display apparatus 100 is connected to the remote control server 700, the remote control server 700 transmits a certification number the image display apparatus 100. The certification number may be one for separately identifying the image display apparatuses which are remote controlled through the remote control server 700. For example, the terminal 1 710 may classify remote controlled image display apparatus 100 from different image display apparatuses by the certification number transmitted to the image display apparatus 100.

Figure 12:
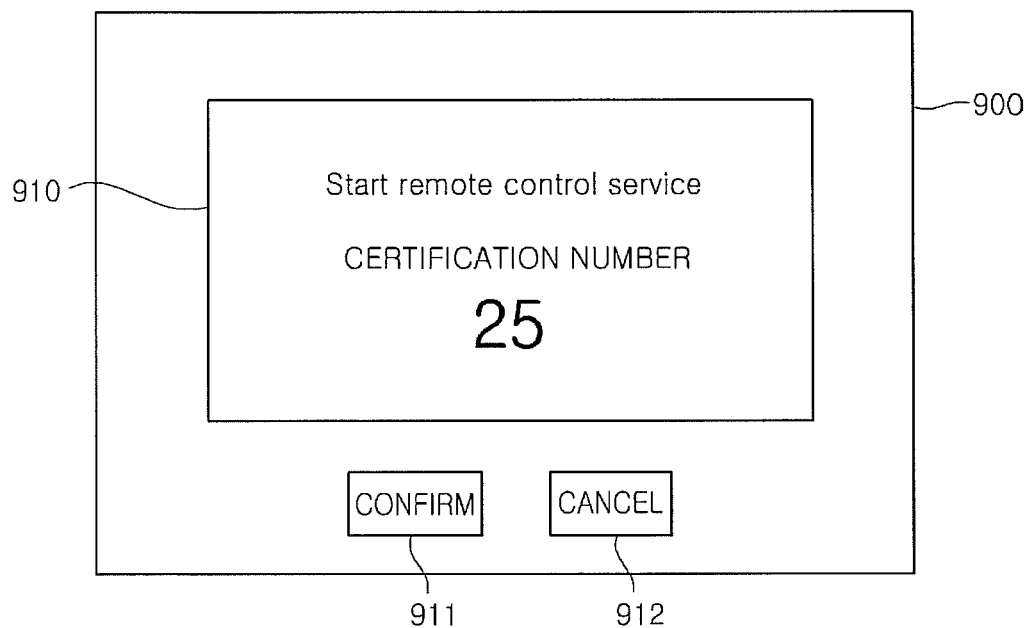
FIGS. 12 to 21 show embodiments of a method for establishing a connection to a remote control server.

Referring to FIG. 12, the image display apparatus 100 may receive a certification number "25" from the connected remote control server 700, and display a certification number dialogue widow 910 for representing the received certification number "25" on the screen 900. The certification number "25" is used as a number for identifying the image display apparatus 100 during the process of providing the remote control service.

Figure 13:
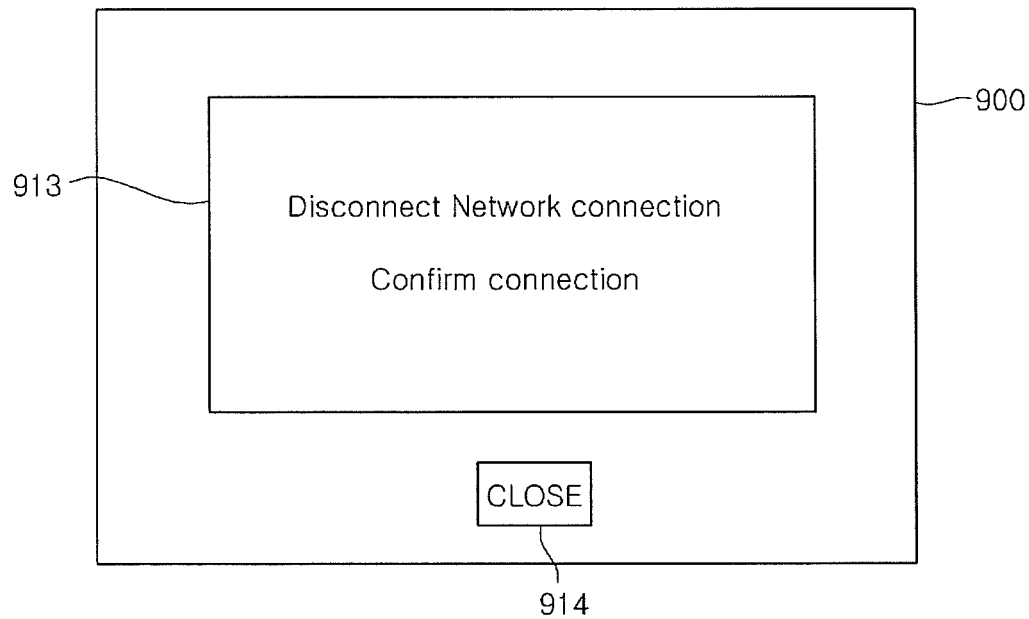

If there is an error as that a LAN line is not connected to the image display apparatus 100, a connection error dialogue window 913 may be displayed on the screen 900 of the image display apparatus 100 as shown FIG. 13 in response to the user' remote control service request in order to indicate the network error.

Figure 14:
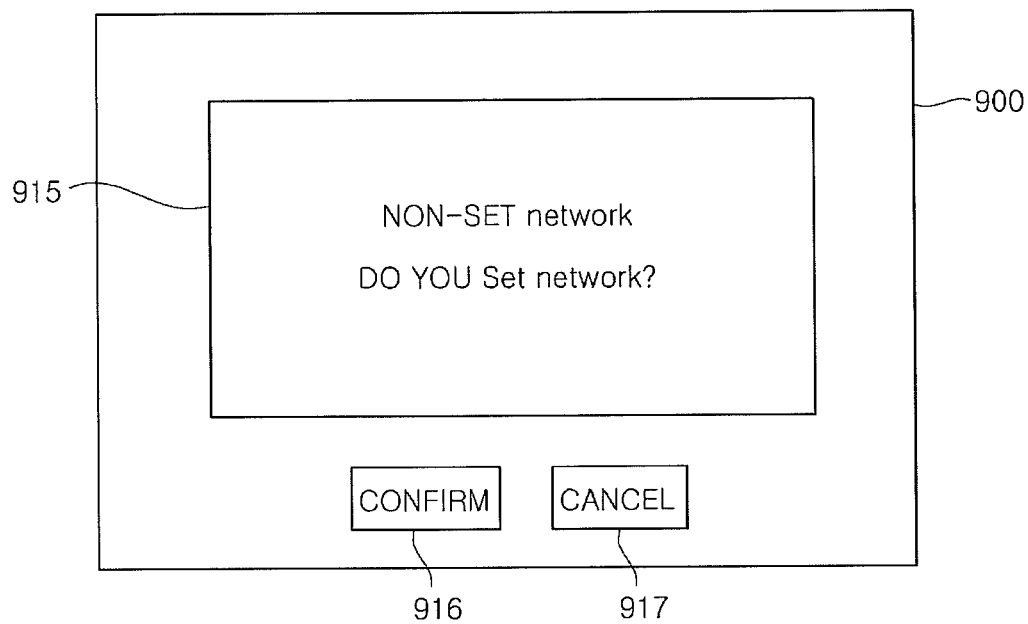
Figure 15:
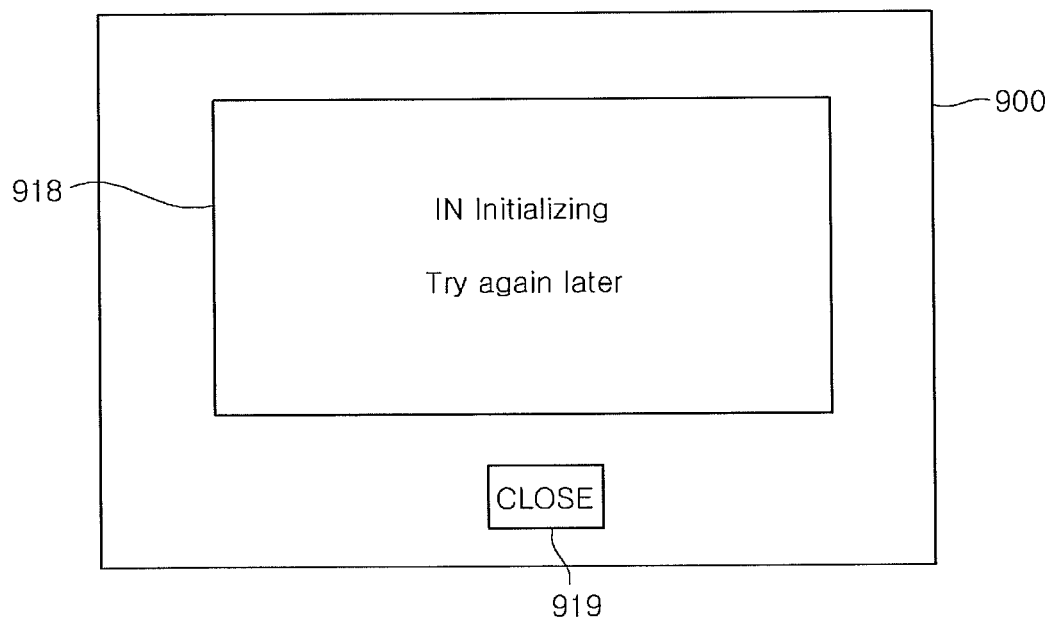

If there is an error in the network setting, although a LAN line is connected to the image display apparatus 100, a setting error dialogue window 914 may be displayed on the screen 900 of the image display apparatus 100 as shown FIG. 14 in response to the user input requesting the remote control service in order to indicate the network setting error.

In state of the screen 900 shown in FIG. 14, when the user selects a "confirm" button 916, the control unit 170 may perform an operation for the network setting. In addition, if there is an error in the network initialization and a failure of the network connection occurs, an initialization dialogue window 918 may be displayed on the screen 900 of the image display apparatus 100 as shown FIG. 15 in response to the user input requesting the remote control service in order to indicate performing the network initialization work.

Hereinafter, a method of identifying and controlling the image display apparatus 100 by the terminal 1 710 connected to the remote control server 700 by using the certification number will be described in detail with reference to FIGS. 16 to 18.

Figure 16:
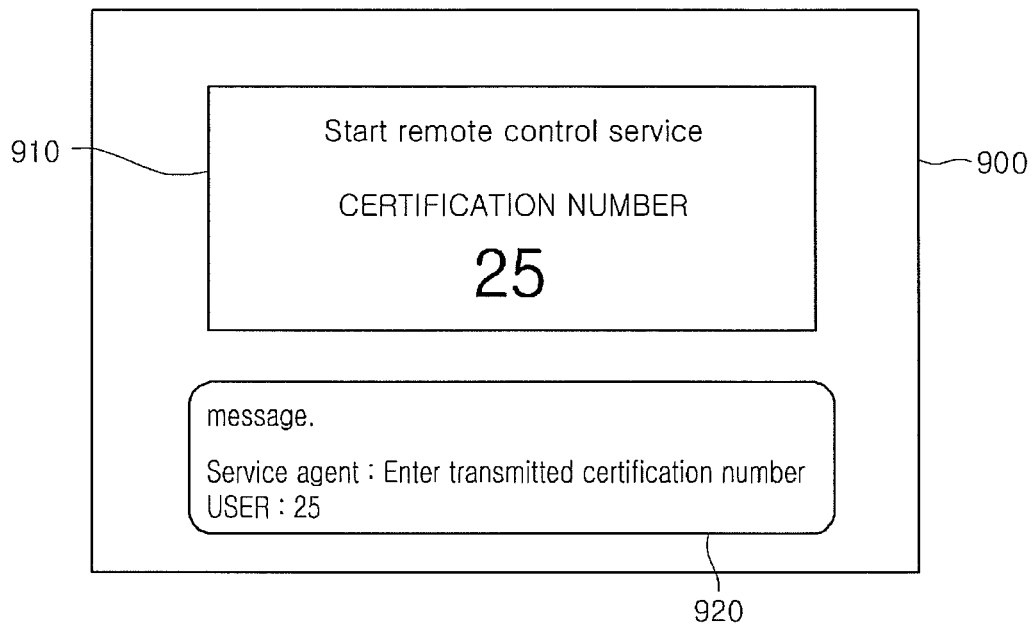

Referring to FIG. 16, a message window 920 may be displayed on the screen 900 of the image display apparatus 100 and receives and transmits a message between the service agent and the user of the terminal 1 710 remote controlling the image display apparatus 100.

During a remote control service is provided, the user of the image display apparatus 100 may receive and transmit the message from and to the service agent by using the message window 920, and accordingly the remote control service may be performed more effectively.

As shown in FIG. 16, the image display apparatus 100 receives and display the certification number from the remote control server 700, and then displays a message from the service agent which is a message to allow the user to input the transmitted certification number on the message window 920.

Accordingly, the user of the image display apparatus 100 may input the certification number "25" to the message window 920 on the screen 900. In this time, the input certification number is transmitted to the terminal 1 710 through the remote control server 700, such that the service agent may recognize that the certification number of the image display apparatus 100 is "25".

In another embodiment, in a case that the user dials a call center providing the remote control service by using separate communication devices such as wire and wireless telephone and the telephone is connected, the user may inform the service agent that the certification number displayed on the screen 900 is "25".

The terminal 1 710 may identify the image display apparatus 100 requesting the remote control service by using the certification number, for example, "25" of the image display apparatus 100 recognized as above to select a target apparatus to be controlled.

Figure 17:
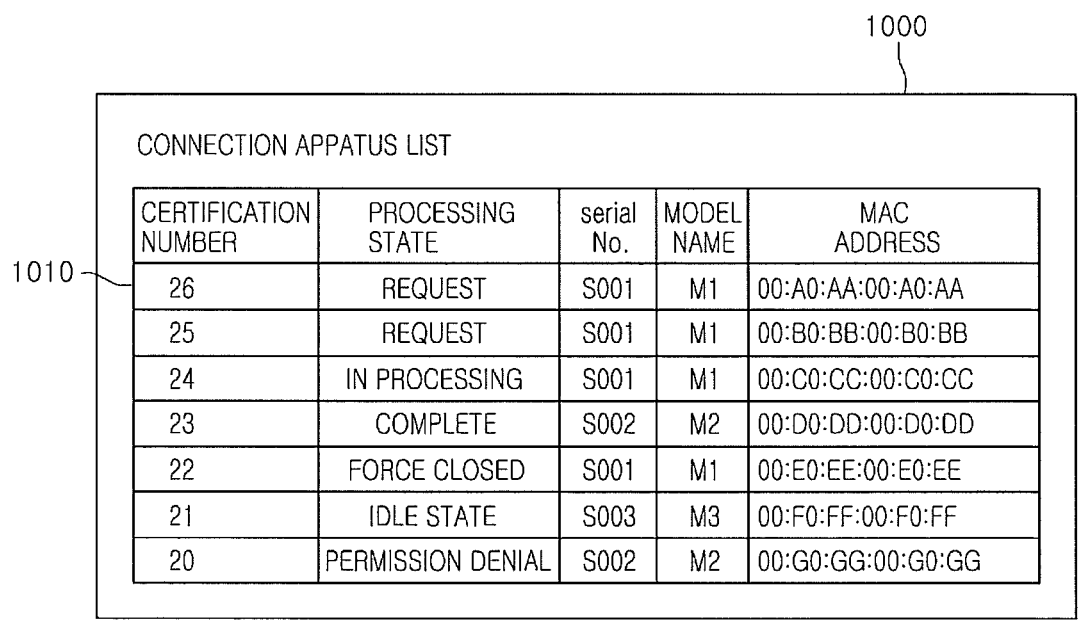

Referring to FIG. 17, the terminal 1 710 may display a connected apparatus list 1010 including information about a plurality of apparatuses connected to the remote control server 700 on the terminal 1 710.

The connected apparatus list 1010 may include the transmitted certification number from the remote control server 700, a current processing state of the remote control service, serial numbers (serial No.) which are identification information of the corresponding apparatus, model names and MAC addresses, with respect to the plurality of connected apparatuses.

The identification information of the connected apparatus as described above may be transmitted from the corresponding apparatus to the remote control server 700 during the process of connecting the corresponding apparatus to the remote control server 700.

The connected apparatus list 1010 may further include information about connection time connected to the remote control server 700, national information of the corresponding apparatus and platforms, and consultation numbers and consultants.

The terminal 1 710 may select the connected apparatus corresponding to the recognized certification number among the connected apparatuses included in the connected apparatus list 1010 to install the image display apparatus 100 to be controlled.

For example, the service agent using the terminal 1 710 may confirm that the certification number of the image display apparatus 100 is "25" by the method as described with reference to FIG. 16, and select an apparatus corresponding to the certification number "25" in the connected apparatus list 1010 shown in FIG. 17, for example, an apparatus having MAC address "00:C0:CC:0000:CC which is a current request state to start the remote control for the image display apparatus 100.

Figure 18:
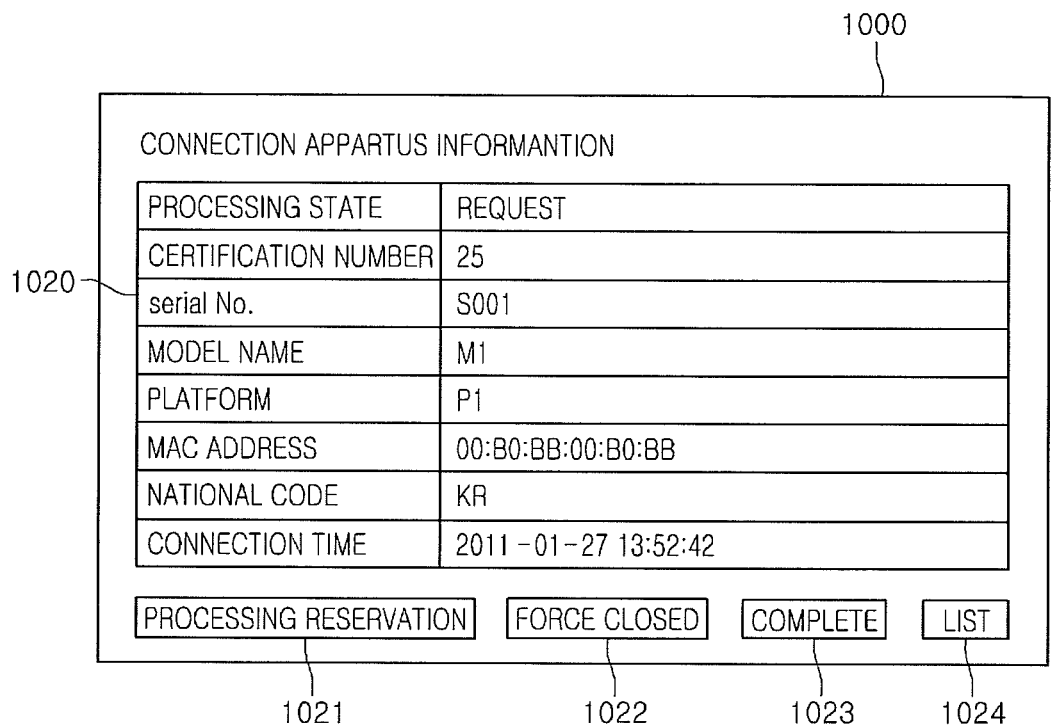

Referring to FIG. 18, when a apparatus, which has the certification number "25" among the connected apparatus list 1010, is selected, detailed information 1020 regarding the selected apparatus "25" may be displayed on a screen 1000 of the terminal 1 710.

When "process reservation" button 1021 displayed on the screen 1000 by the service agent is selected, the terminal 1 710 may specify the image display apparatus 100 as an apparatus to be remote controlled.

Figure 19:
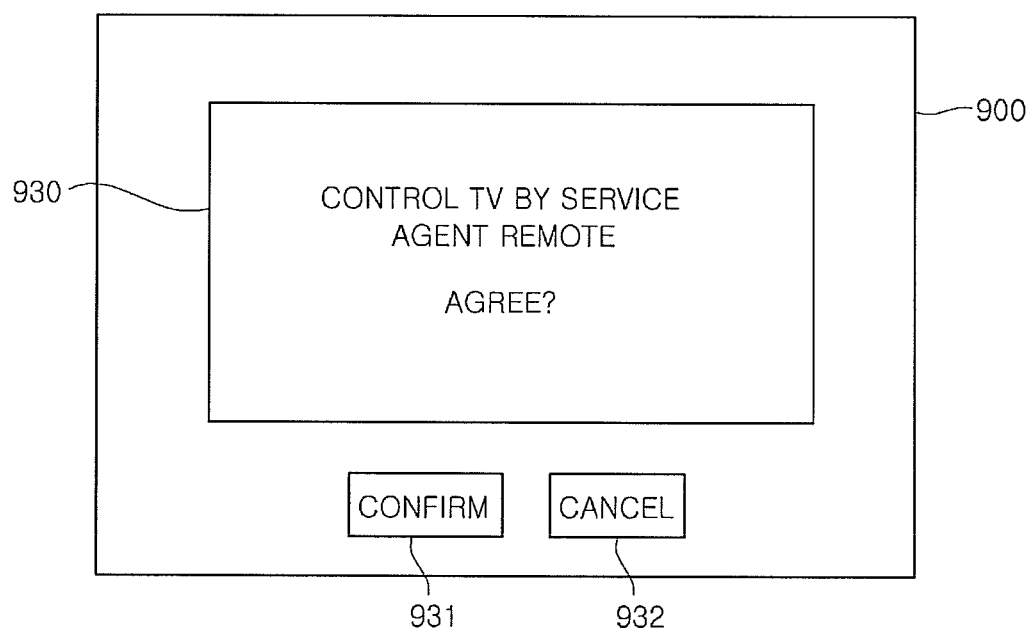
Figure 20:
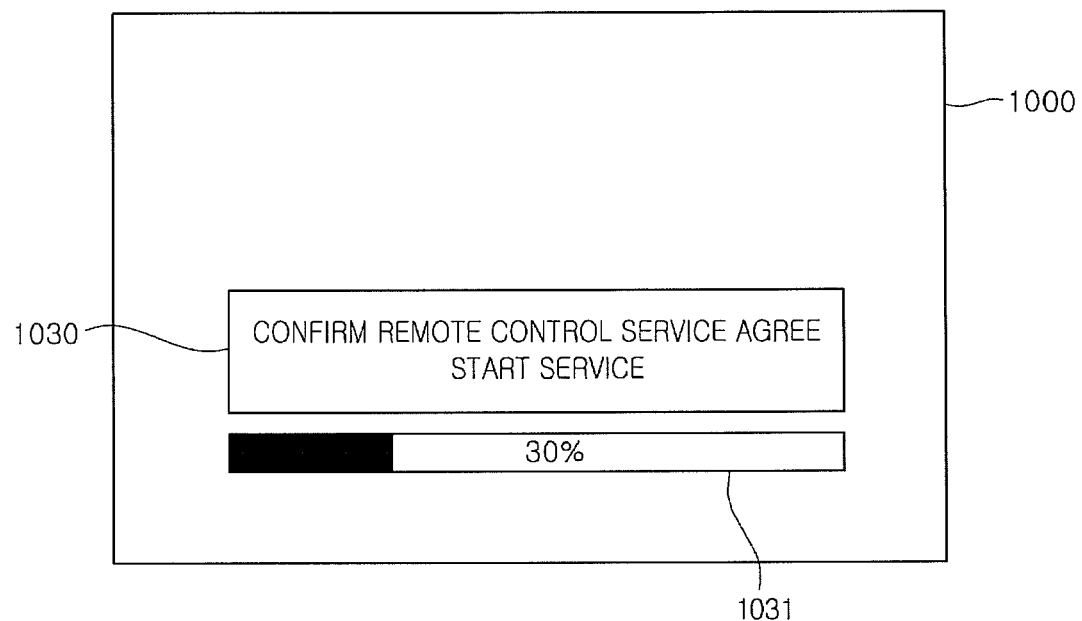

Referring to FIG. 19, when the image display apparatus 100 is selected by the terminal 1 710 as described above, a question window 930, which indicates a question of whether the user agrees, may be displayed on the screen 900 of the image display apparatus 100.

When the user of the image display apparatus 100 selects a "confirm" button 931 displayed on the screen 900, an initial screen for stating the remote control service may be displayed.

Before the user of the image display apparatus 100 selects a "confirm" button 931 and the user may accept the remote controlling, windows 1030, which indicate the progress of the agreement, may be displayed on the screen 1000 of the terminal 1 710. For example, a progress bar 1031, which indicates a progress of user agreement setting time, is displayed on the screen 1000 of the terminal 1 710. When the user does not agree until the progress bar 1031 is moved to the end, the remote control service may be canceled.

Figure 21:
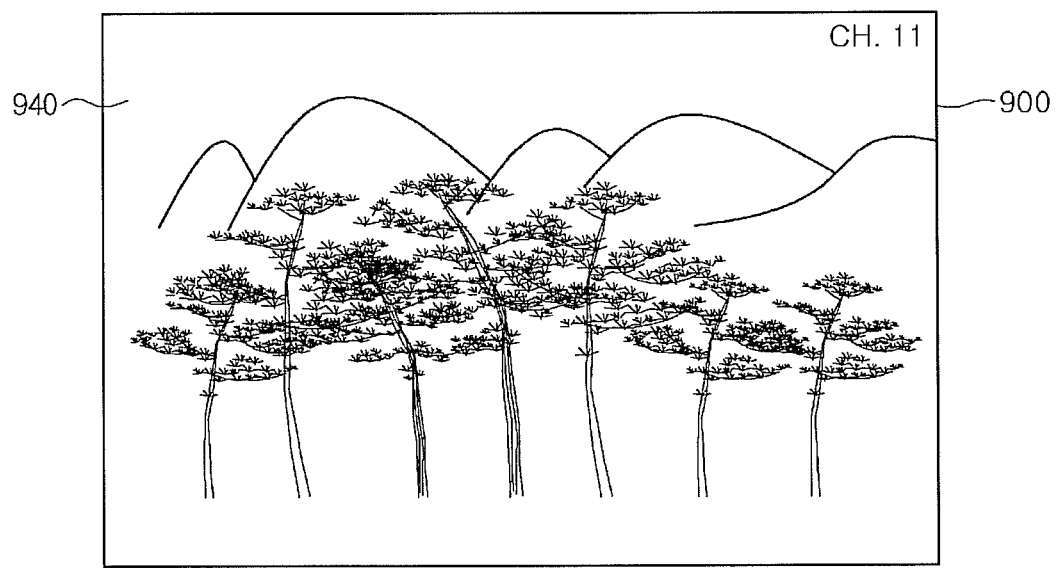

When the user agrees to the remote controlling, the windows for stating the remote control service as described above disappear, and the image display apparatus 100 may return to a normal operation state. For example, when the user selects "OK" button 931 on the screen 900 shown in FIG. 19, an image 940 of a broadcast channel "CH. 11" in which the user was previously viewing, as shown in FIG. 21, may be displayed on the screen 900.

FIGS. 22 to 27 are diagrams showing embodiments of a method of remotely controlling a terminal connected to a remote control server. According to the user operation as described above, when the image display apparatus 100 is connected to the remote control server 700 and to the terminal 1 710, the terminal 1 710 may start the remote controlling for the image display apparatus 100.

Figure 22:
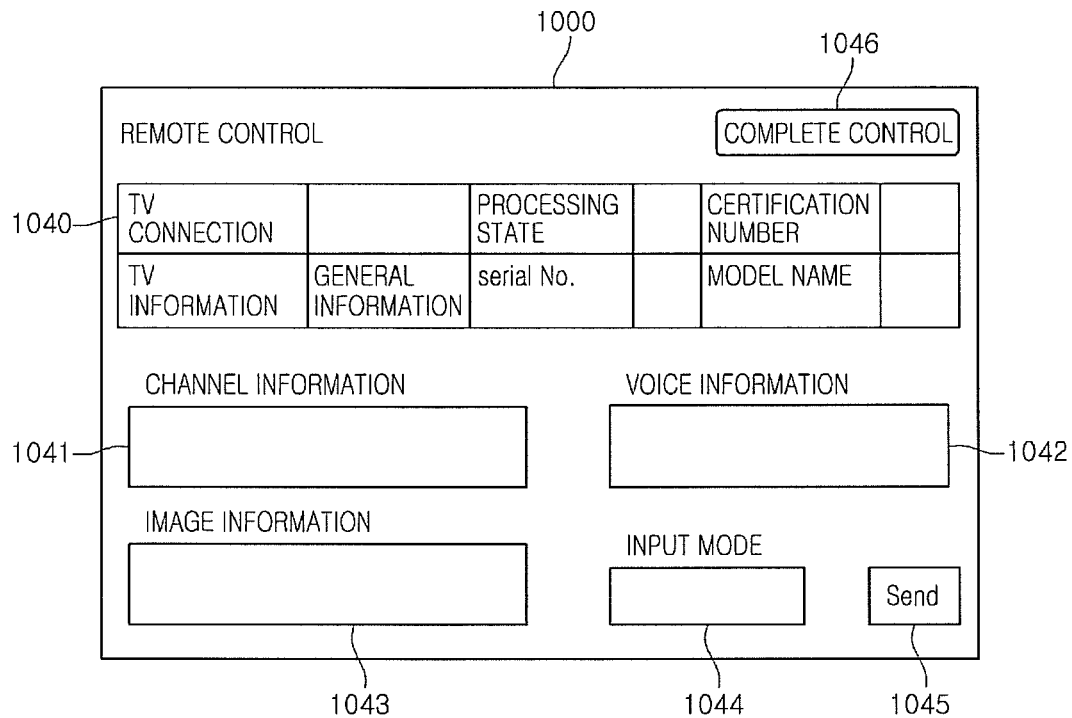
FIGS. 22 to 27 show embodiments of a method for allowing a terminal connected to the server to remotely control a display apparatus.

Referring to FIG. 22, information about the image display apparatus 100 to remote control, for example, setting values may be displayed on the screen 1000 of the terminal 1 710. The service agent, which is the user of the terminal 1 710, may request the transmission of specific setting values to be confirmed among the setting values of the image display apparatus 100, and the requested specific setting values may be received from the image display apparatus 100 through the remote control server 700 to be displayed on the screen 1000.

For example, as shown in FIG. 22, when the service agent requests a confirmation of "General Information" among TV information set in the image display apparatus 100, the terminal 1 710 may transmit a signal requesting the "General Information to the remote control sever 700 to request the transmission of "General Information" to the image display apparatus 100.

The image display apparatus 100 may extract information corresponding to the "General Information" among the setting values in response to the transmission request to transmit the extracted information to the remote control server 700, and the terminal 1 710 may receive the general information through the remote control server 700 to display the received general information on the screen 1000.

For example, the general information may include channel information, voice information, image information, and the like, all of which are set in the image display apparatus 100, and the terminal 1 710 may display the information transmitted from the image display apparatus 100 on each of different windows 1041, 1043, 1044.

Meanwhile, the kinds of values selected from the terminal 1 710 may include user interface (UI) information, external storage medium information, internal storage medium information, network information, product information or 3D display information, and the like.

That is, terminal 1 710 may receive and display specific setting values of image display apparatus 100 to be confirmed by the service agent from the image display apparatus 100 through remote control server 700 and accordingly the service agent may confirm a current setting state of image display apparatus 100 quickly and easily.

Referring to FIG. 22, the user may request a performance of a specific function to image display apparatus 100 by using agent input mode input window 1044.

For example, selectable functions by using the input mode input window 1044 may include functions of various image display apparatus 100 such as a screen size change, an image mode change, an image mode initialization, a sleep mode setting, an auto-off setting, an auto-on setting, a sound mode change, an auto-volume setting, a TV speaker-on setting, a sound mode initialization, a password reset, a key lock setting, a user environment setting change, a screen image retention setting or an external input mode setting, and the like.

When the service agent inputs desired function on the input window 1044 to select "Send" button 1042, the terminal 1 710 may transmit the signals for requesting the corresponding functions to the remote control server 700, and the remote control server 700 may transmit a command signal requesting the performance of the function to the image display apparatus 100. The image display apparatus 100 may perform functions corresponding to the received command signal.

The remote control screen as shown in FIG. 22 may include the identification information window 1040 which displays identification information regarding the image display apparatus 100 to be remote controlled. In addition, the remote control screen may further include an input window (not shown), a message input window (not shown), and the like for selecting whether the user's remote controller of the image display apparatus 100 is operated. When the service agent selects "control exit" button 1046, the remote control service in progress may be terminated.

Figure 23:
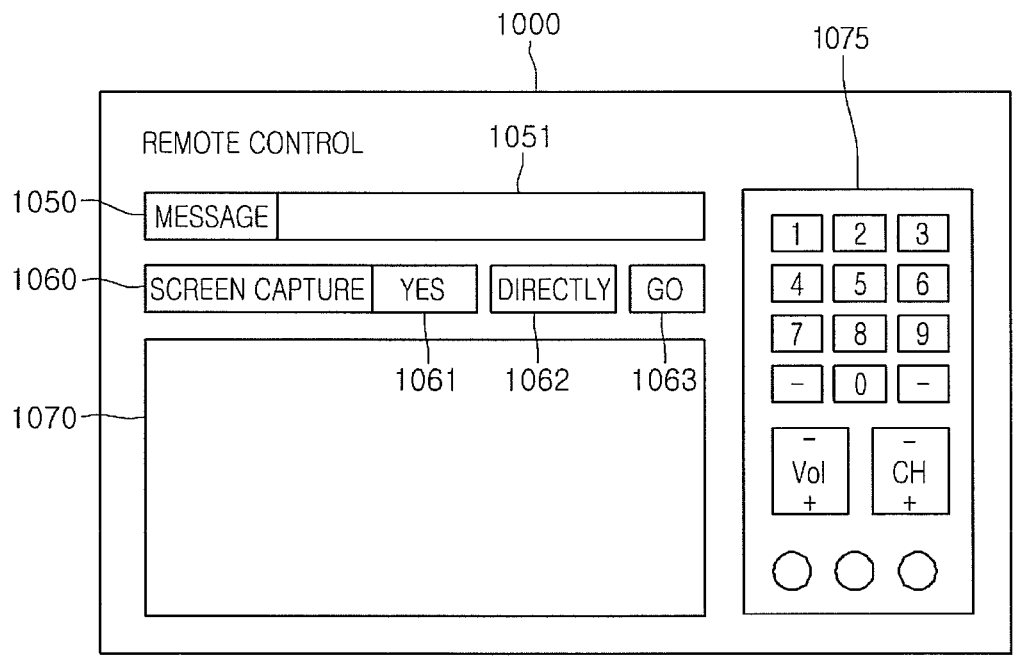

Referring to FIG. 23, a captured image 1070 received from the image display apparatus 100 through the remote control server 700 may be displayed on the screen 1000 of the terminal 1 710. In addition, an input window 1075 of a remote controller shape for performing a specific function of the image display apparatus 100 may be displayed on the screen 1000.

The service agent, which is the user of the terminal 1 710, may input a desired function for the image display apparatus 100 by using key buttons of an input window 1075 displayed on the screen 1000, and the input function may request the image display apparatus 100 through the remote control server 700.

After the service agent requests the performance of a specific function to the image display apparatus 100 as described above, the service agent requests the transmission of the captured image representing a current screen state of the image display apparatus 100 in order to confirm the results of performance of the requested function.

The captured image 1070 transmitted from the image display apparatus 100 through the remote control server 700 may displayed on the screen 1000 of the terminal 1 710. The service agent may set yes or no of a capture, capture time and capture cycle of the screen on the image display apparatus 100 by using input windows 1061, 1062 or a button 1063 displayed the screen 1000.

Figure 24:
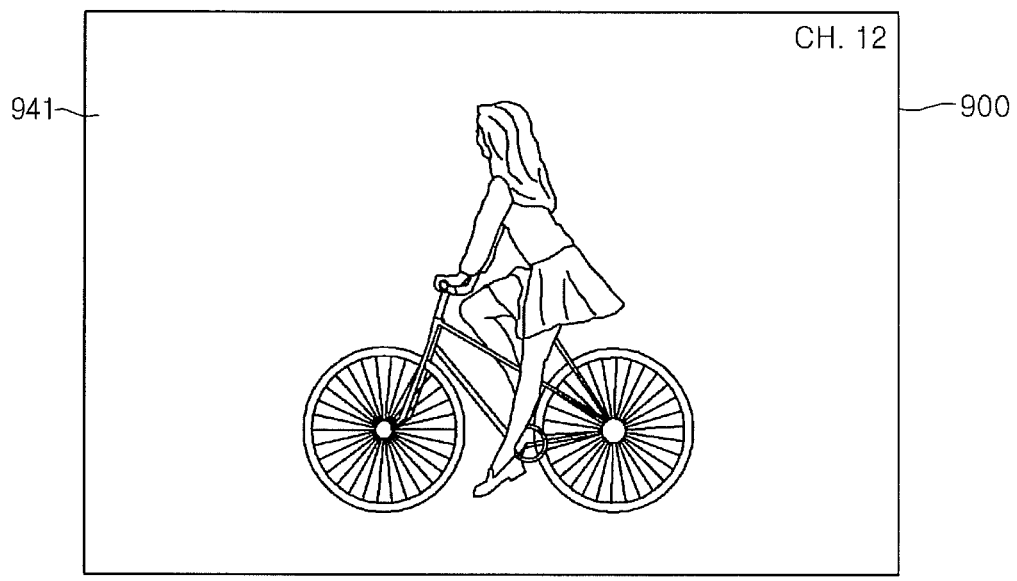

For example, when the service agent performs "channel up" function of the image display apparatus 100 by using channel up-down buttons of the input window 1075 on the screen 1000 shown in FIG. 23, as shown in FIG. 24, a broadcast screen 941 of increased "CH. 12" by channel number 1 from "CH. 11" which is previous viewing channel, is displayed on the screen 900 of the image display apparatus 100.

According to the function performance as described above, a current screen state of the image display apparatus 100 is generated by a captured image to transmit the generated captured image to the terminal 1 710 through the remote control server 700.

Figure 25:
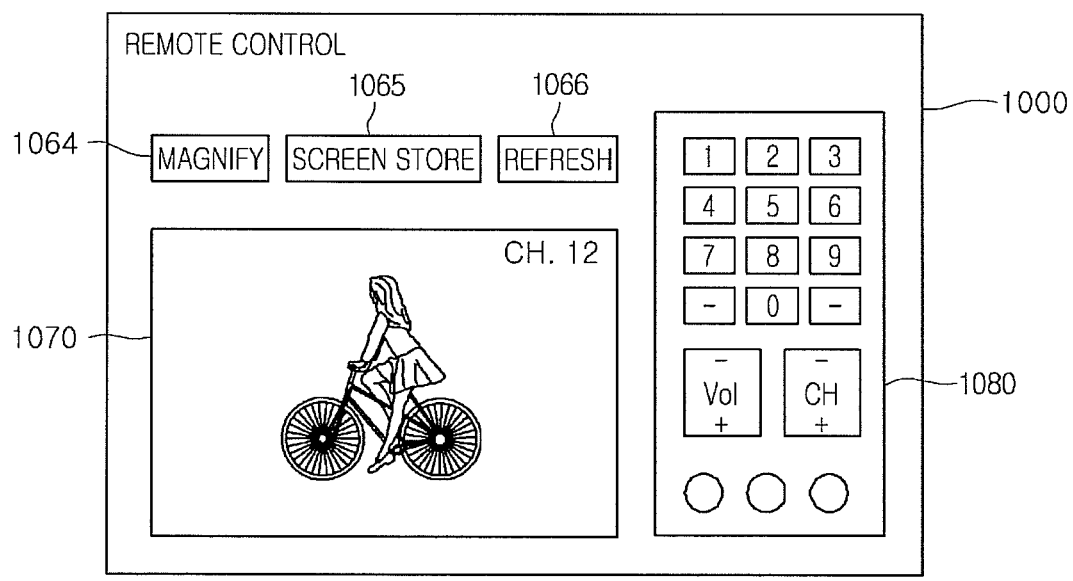

As shown in FIG. 25, the broadcast image of "CH. 12" current displayed in the image display apparatus 100, as the captured image 1070, may be displayed on the screen 1000 of the terminal 1 710. In addition, referring to FIG. 23, it is possible to magnify, store or refresh the captured image 1070 by using buttons 1064, 1065, 1066 displayed on the screen 1000.

By the processes described above, when the diagnosis for the image display apparatus 100 is complete or a problem is resolved, the service agent may select a "control exit" button 1046, as shown in FIG. 22, to end the remote control service in progress.

Figure 26:
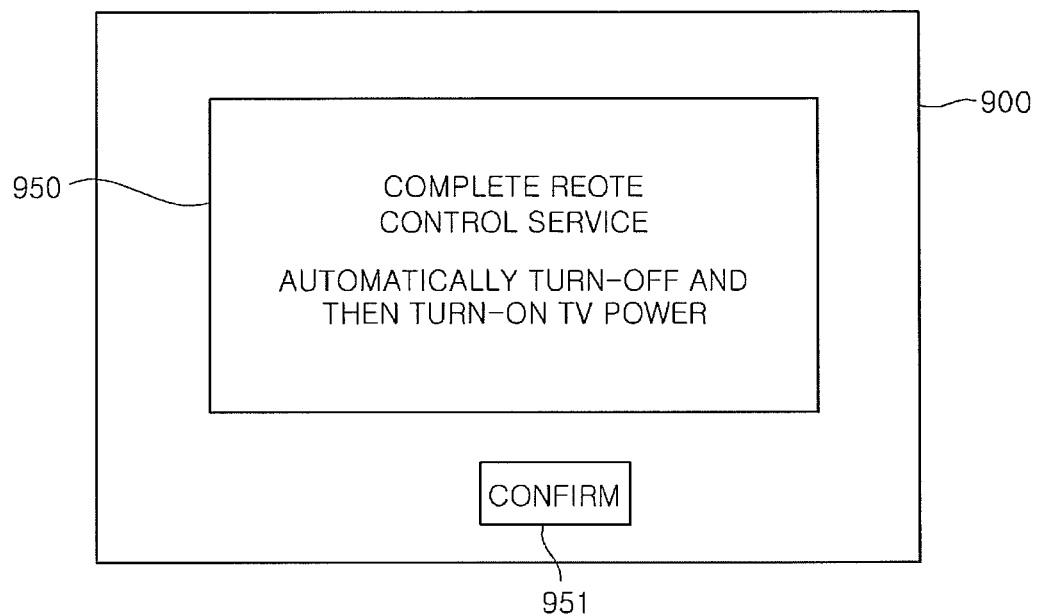

In this case, referring to FIG. 26, an end notification window 950, indicating that the remote control service is complete, may be displayed on the screen 900 of the image display apparatus 100, and in the image display apparatus 100, power may be automatically turned off and then turned on to apply the new settings.

Figure 27:
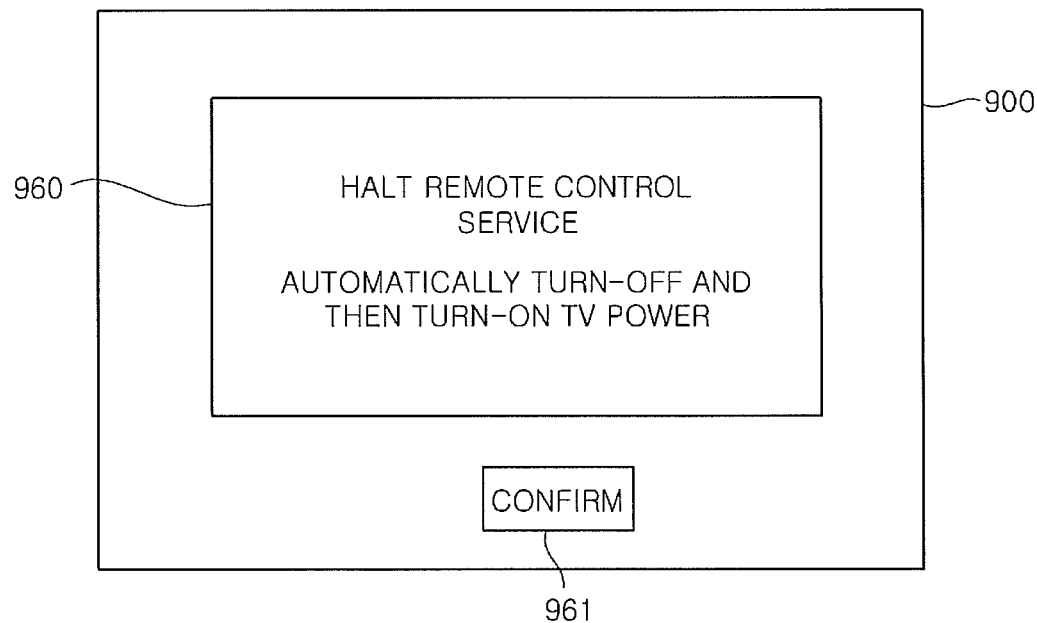

As shown in FIG. 27, when the remote control service in progress abnormally end, an halt notification window 960, indicating that the remote control service is halted, may be displayed on the screen 900 of the image display apparatus 100, and in the image display apparatus 100, power may be automatically turned off and then turned on.

Figure 28:
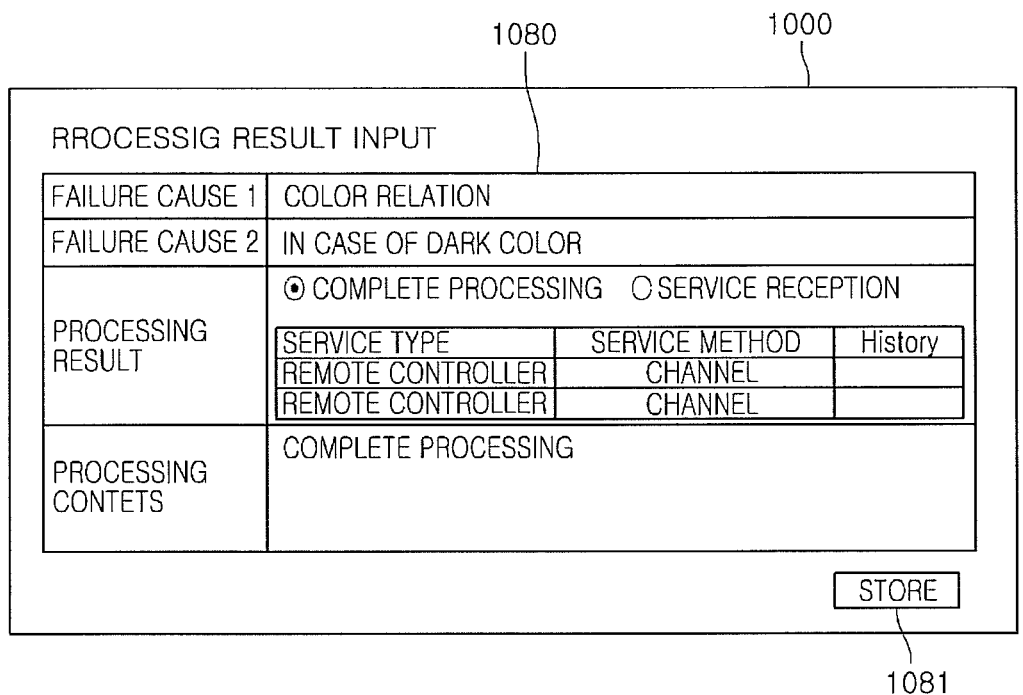
FIG. 28 shows a first embodiment of a method for inputting results of remote control processing.
Figure 29:
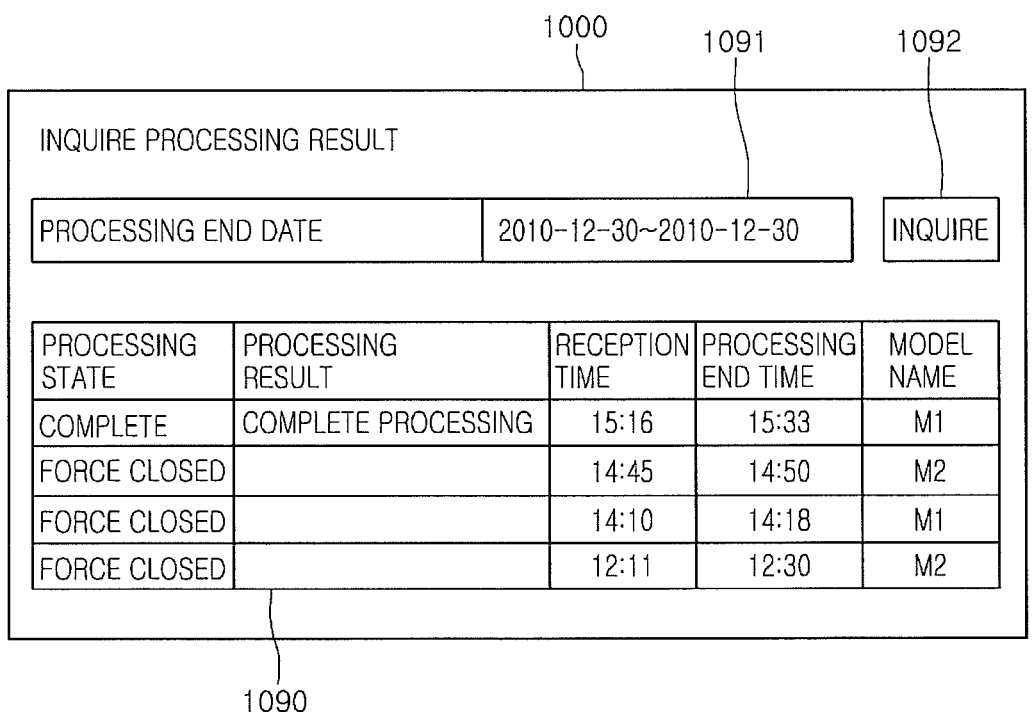
FIG. 29 shows a first embodiment of a method of searching results of remote control processing.
Figure 30:
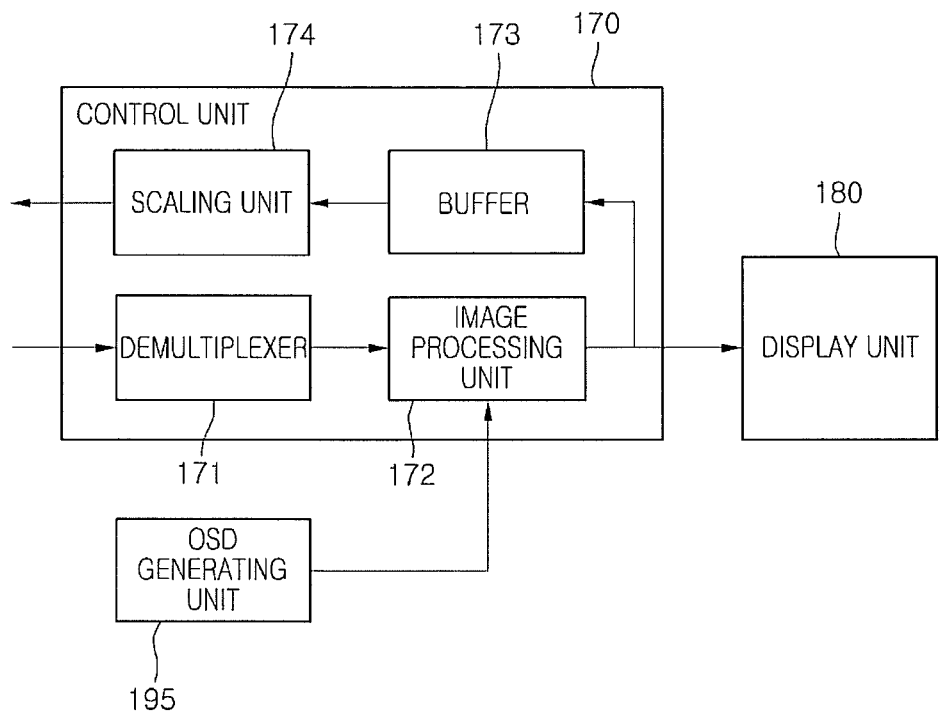
FIG. 30 shows an embodiment of a configuration of a control unit included in an image display apparatus.

As described above, the processing result of the remote control service performed by the terminal 1 710 may be input and stored in the remote control server 700 by using the input window 1080 as shown in FIG. 28. In addition, referring to FIG. 29, as described above, the processing result of the remote control service stored in the remote control server 700 may be searched and displayed on the terminal 1 710 according to conditions of processing end date, and the like, FIG. 30 is a block diagram showing an embodiment of a configuration of a control unit included in an image display apparatus. The control unit 170 may include a de-multiplexer 171, an image processing unit 172, a buffer 173 and a scaling unit 174.

Referring to FIG. 30, the image processing unit 172 may mix video layer data separated by the de-multiplexer 171 and OSD layer data output from an OSD generating unit 195. Further, the image processing unit 172 may generate image signals displayed on a screen 900 to output the generated image signals to a display unit 180.

The buffer 173 may be connected to a output stage of the image processing unit 172 to store the image signals output from the image processing unit 172 to the display unit 180 in a frame unit temporarily.

The scaling unit 174 may scale the temporal stored frame in the buffer 173 into images of desired size to generate a captured image to be transmitted to the remote control server 700.

Figure 31:
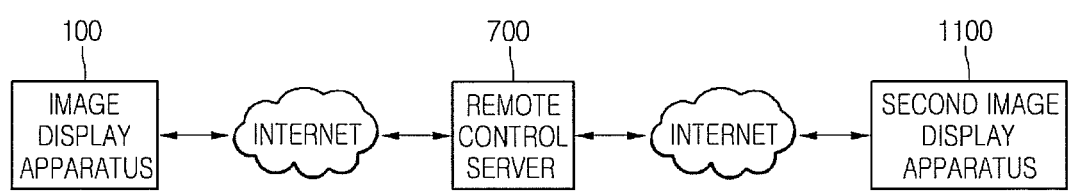
FIG. 31 shows another embodiment of a remote control system for a display apparatus.

FIG. 31 is a block diagram showing a second embodiment of a remote control system configuration of an image display apparatus. Referring to FIG. 31, a second image display apparatus 1100 may be connected to a remote control server 700 by using a network such as internet, and the like to remote control the image display apparatus 100. Operation of the second image display apparatus 1100 may be the same as the operation of the terminal 1 710 described with reference to FIG. 10 to FIG. 30, and thus the detailed description is omitted.

Figure 32:
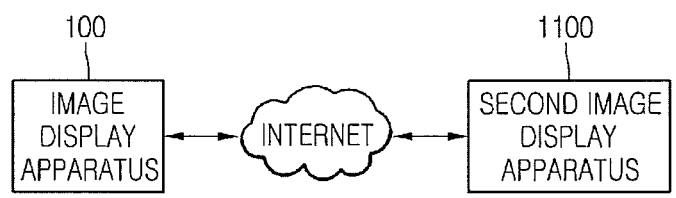
FIG. 32 shows a third embodiment of a remote control system for a display apparatus.

FIG. 32 is a block diagram showing a third embodiment of a remote control system configuration of an image display apparatus. Referring to FIG. 32, a second image display apparatus 1100 may be directly connected to an image display apparatus 100 by using a network such as internet, and the like to remote control the image display apparatus 100. Operation of the second image display apparatus 1100 may be the same as the operation of the terminal 1 710 of the remote control server 700 described with reference to FIG. 10 to FIG. 30, and thus the detailed description is omitted.

One or more of the aforementioned embodiments, therefore, provide a method for providing a remote control service of an image display apparatus. All or a portion of the operations in this method may be performed by a program executed by a computer or other processing device. The program may be stored in a computer-readable recording medium in the server, service terminal, and/or image display apparatus or a device coupled to the image display apparatus including but not limited to a set-top box. Examples of the computer-readable medium include a ROM, a RAM, a CD-ROM, a magnetic tape, a floppy disk, an optical data storage device, and the like, and also including those that are implement in the form of carrier wave (for example, transmission over Internet).

Also, in accordance with at least one embodiment, the computer-readable medium may be distributed in a networked computer system, and computer-readable code may be stored and executed. Function programs, code and code segment for implementing the method may be developed by programmers in the pertinent field of technology.

One or more embodiments described herein also provide a remote control service method capable of enhancing the user's convenience and an image display apparatus thereof.

In accordance with one embodiment, a method of providing a remote control service includes connecting to a remote control server, receiving a command signal which requires a specific functional performance from the remote control server, performing a function in response to the received command signal, and generating a captured image representing a screen state in which the function is performed and transmitting the captured image to remote control server, the image display apparatus is controlled by any one of a plurality of terminals connected to the remote control server.

In accordance with another embodiment, an image display apparatus includes a network interface unit remotely controlled by a terminal connected to a remote control server, transmitting an identification information of a image display apparatus by connecting to the remote control server, and receiving a command signal which requires a specific functional performance from the remote control server, and a control unit performing a function corresponding to the received command signal, mixing a video layer data displayed on a screen and OSD layer data, and generating a captured image representing a screen state in which the function is performed, the generated captured image is transmitted to the remote control server through the network interface unit.

As indicated, the embodiments of the methods described herein may be implemented through execution of code stored in a computer-readable medium.

In accordance with another embodiment, a function required in a terminal connected to a remote control server is performed in an image display apparatus, and a screen capture image representing the result of the function performed is transmitted and displayed to the terminal through the remote control server, such that the remote control services for diagnosing or solving the problems of the image display apparatus and the like may be effectively provided.

In addition, a setting value of an image display apparatus required in a terminal is transmitted and displayed from the image display apparatus to the terminal through a remote control server, such that the current setting state of the image display apparatus may be easily confirmed. Accordingly, it is possible to process by clearly grasping the problems raised in the image display apparatus.

In accordance with another embodiment, a method for servicing a television comprises establishing a network connection with the television, transmitting a first signal through the network connection to instruct the television to automatically perform a predetermined function, and receiving a captured image from a screen of the television after performance of the predetermined function, wherein the captured image is received through the network connection and provides an indication of a presence of an error in operation of the television.

In accordance with another embodiment, a method for controlling a television comprises establishing a connection between the television and a service terminal through a network, receiving a first signal from the network, the first signal including an instruction to cause a processor of the television to perform a function, and transmitting a captured image of a screen of the television to the network after the instruction is performed, wherein the captured image provides an indication of a presence of an error in operation of the television.

In accordance with another embodiment, a television comprising a network interface, a storage area to store a control program, and a processor to execute the program to establish a connection between the television and the network interface, perform a function on the television based on a first signal received from the network interface, and transmit a captured image of a screen of the television to through the network interface after the function is performed, wherein the captured image provides an indication of a presence of an error in operation of the television.

An image display apparatus according to one embodiment, for example, as an intelligent image display apparatus having both of the broadcast reception function and the computer assisted function, may include more convenient user-friendly interface than a handwriting input apparatus, a touch screen or space remote controller, or the like, by adding an internet function while fulfilling a broadcasting receiving function. In addition, the image display apparatus may also perform on e-mail, a web browsing, Internet banking or games, and the like by connecting to an Internet and computer supporting the wired or wireless internet function. In order to perform various functions described above, a general purpose operation system (OS) may be used.

Therefore, for the image display apparatus described herein, various applications may be freely added or deleted on a general OS Kernel. For example, various user-friendly functions may be performed. More specifically, the image display apparatus may be a network TV, a HBBTV, a smart TV and the like, for example, may be applied in a smart phone in some cases.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments. The features of one embodiment may be combined with the features of one or more other embodiments to form additional embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

We claim:

1. A television for providing a remote control service, comprising:
    a tuner to tune a broadcast signal including audio, video, and PSI data;
    a network interface unit to connect the television through an internet;
    a user input interface unit to receive control signals from a remote control device;
    a display unit to display the video; and
    a control unit to cooperate with the tuner, the network interface unit, the user input interface unit and the display unit,
    wherein the control unit is configured to:
        receive a first command to enter a remote control service by the remote control device,
        obtain a certification number through the network interface unit,
        display, on the display unit, a certification number window including a certification number that is for identifying the television to be controlled by a service agent terminal, wherein the certification number is provided to the service agent terminal in order for receiving the remote control service from the service agent terminal by using a communication device such as wire or wireless telephone,
        allow that the television is selected as a target apparatus for providing the remote control service to the service agent terminal by using the certification number, wherein the remote control service is a service for solving a problem such as failure in the television,
        display the video of a normal operation state that is the broadcast signal received from the tuner,
        receive a second command for performing a function related with at least one of channel, voice, and image of the broadcast signal from the service agent terminal,
        perform the function according to the second command, and
        transmit, to the service agent terminal, a current screen state image that displays a result of performance of the function.

2. The television of claim 1, wherein the function comprises a specific setting values that is at least one of a screen size change, an image mode change, an image mode initialization, a sleep mode setting, an auto-off setting, an auto-on setting, a sound mode change, an auto-volume setting, a TV speaker-on setting, a sound mode initialization, a password reset, a key lock setting, a user environment setting change, a screen image retention setting and an external input mode setting.

3. The television of claim 1, wherein the certification number window includes a message for informing the certification number to the remote service agent.

4. The television of claim 1, wherein the control unit is further configured to display a connection error window on the display unit when the television is not connected through the internet.

5. The television of claim 1, wherein the control unit is further configured to:
    display a network setting error window on the display unit when there is an error in a network setting of the television,
    receive a user input to solve the error in the network setting of the television, and
    display, on the display unit, an initialization dialogue window that indicates performing initialization in the network setting.

6. The television of claim 1,
    wherein the control unit is further configured to display, on the display unit, a question window that indicates a question of whether the user agrees to allow the remote control service.

7. The television of claim 6, wherein the question window includes a confirm button to agree for allowing the remote control service and a cancel button to disagree for allowing the remote control service.

8. The television of claim 1, wherein the control unit is further configured to display, on the display unit, an end notification window that the remote control service is completed.

9. The television of claim 1, wherein the command to enter the remote control service is received by using a specific key input of the remote control device.

* * * * *